United States Patent
Hall et al.

(10) Patent No.: US 9,811,958 B1
(45) Date of Patent: Nov. 7, 2017

(54) APPARATUS ENABLING SECURE WIRELESS ACCESS TO AN ENCLOSURE

(71) Applicants: David R. Hall, Provo, UT (US); Mark Hall, Springville, UT (US); Craig Boswell, Draper, UT (US); Joe Fox, Spanish Fork, UT (US); Corey Webb, Spanish Fork, UT (US); Jedediah Knight, Provo, UT (US)

(72) Inventors: David R. Hall, Provo, UT (US); Mark Hall, Springville, UT (US); Craig Boswell, Draper, UT (US); Joe Fox, Spanish Fork, UT (US); Corey Webb, Spanish Fork, UT (US); Jedediah Knight, Provo, UT (US)

(*) Notice: Subject to any disclaimer, the term of this patent is extended or adjusted under 35 U.S.C. 154(b) by 0 days.

(21) Appl. No.: 15/662,641

(22) Filed: Jul. 28, 2017

Related U.S. Application Data

(63) Continuation-in-part of application No. 14/533,324, filed on Nov. 5, 2014, and a continuation-in-part of application No. 14/533,291, filed on Nov. 5, 2014, and a continuation-in-part of application No. 14/533,268, filed on Nov. 5, 2014, and a continuation-in-part of application No. 14/533,247, filed on Nov. 5, 2014, and a continuation-in-part of application No. 14/532,523, filed on Nov. 4, 2014.

(51) Int. Cl.
*G06K 5/00* (2006.01)
*G07C 9/00* (2006.01)
*H04L 9/06* (2006.01)
*G06Q 50/28* (2012.01)

(52) U.S. Cl.
CPC .......... *G07C 9/00111* (2013.01); *G06Q 50/28* (2013.01); *H04L 9/0643* (2013.01); *H04L 2209/04* (2013.01)

(58) Field of Classification Search
CPC .......................... G07F 7/1008; G07C 9/00103
USPC ............................ 235/380, 382, 383, 385
See application file for complete search history.

(56) References Cited

U.S. PATENT DOCUMENTS

| | | | |
|---|---|---|---|
| 6,233,568 B1 * | 5/2001 | Kara | G01G 19/005 705/401 |
| 6,542,933 B1 * | 4/2003 | Durst, Jr. | G06F 17/30879 707/999.009 |
| 7,035,835 B2 * | 4/2006 | Shi | H03K 5/023 327/103 |

(Continued)

*Primary Examiner* — Daniel St Cyr

(57) ABSTRACT

An apparatus for more efficiently enabling secure access to an enclosure is described herein. The apparatus may include a wireless transmitter in a selectably opaque container, a wireless transceiver, a GPS receiver, an NFC transmitter and/or receiver, one or more hardware processors, and hardware memory. The hardware memory stores instructions for receiving a current location of the apparatus and comparing that location to a delivery address of the enclosure. As the location is within a certain range of the delivery address the apparatus sends a request to a cloud-based server for a hash digest masking an acceptable input for an access control mechanism associated with the enclosure. The apparatus receives the hash digest and forwards it to the access control mechanism via the wireless transmitter. Computer executable code for handling such tasks, and a cloud-based server for generating the hash digest, are also described herein.

20 Claims, 27 Drawing Sheets

(56) References Cited

U.S. PATENT DOCUMENTS

2005/0264400 A1* 12/2005 Fisher ................ G07C 9/00103
340/5.73

* cited by examiner

Add New Access Code  900c

User ID: Repairman — 910
Access Code: 7717 — 912

- ☐ Monday
- ☐ Tuesday
- ☑ Wednesday
- ☐ Thursday
- ☐ Friday
- ☐ Saturday
- ☐ Sunday

Start Time: 09:00 AM
End Time: 05:00 PM

} 914

[ Save ]  [ Back ]

Share With:
916 — johndoe@repairman.com

Fig. 9C

Edit Existing Access Code  900d

User ID: Dry Cleaner — 910
Access Code: 1123 — 912

- ☐ Monday
- ☐ Tuesday
- ☑ Wednesday
- ☑ Thursday
- ☐ Friday
- ☑ Saturday
- ☑ Sunday

Start Time: Any Time
End Time: Any Time

} 914

[ Save ]  [ Back ]

Share With:
916 — janedoe@drycleaner.com

Fig. 9D

Recent Activity 900e

| User ID | Action | Time | Date |
|---|---|---|---|
| Shipping Co. 1 | CLOSED | 07:06 AM | 09/09/14 |
| Shipping Co. 1 | OPEN | 07:02 AM | 09/09/14 |
| Dry Cleaner | CLOSED | 01:33 PM | 09/08/14 |
| Dry Cleaner | OPEN | 01:32 PM | 09/08/14 |
| Repairman | CLOSED | 10:35 AM | 09/08/14 |
| Shipping Co. 2 | CLOSED | 8:49 AM | 09/08/14 |
| Shipping Co. 2 | OPEN | 8:47 AM | 09/08/14 |
| Repairman | OPEN | 8:15 AM | 09/08/14 |

} 918

920 — ☐ Show All Activity

[Back]

Fig. 9E

Recent Activity 900f

| User ID | Action | Time | Date |
|---|---|---|---|
| Shipping Co. 1 | CLOSED | 07:06 AM | 09/09/14 |
| Shipping Co. 1 | OPEN | 07:02 AM | 09/09/14 |
| Dry Cleaner | CLOSED | 01:33 PM | 09/08/14 |
| Dry Cleaner | OPEN | 01:32 PM | 09/08/14 |
| Remote | CLOSED | 11:15 AM | 09/08/14 |
| Remote | OPEN | 11:13 AM | 09/08/14 |
| Repairman | CLOSED | 10:35 AM | 09/08/14 |
| Invalid Acc. Code | NONE | 9:10 AM | 09/08/14 |

} 922

920 — ☑ Show All Activity

[Back]

APPARATUS ENABLING SECURE WIRELESS ACCESS TO AN ENCLOSURE

RELATED APPLICATIONS

This application is a continuation-in-part of U.S. patent application Ser. No. 14/532,523 filed on Nov. 4, 2014 and entitled "Automated Tracking-Number Based Administration of Access Codes;" Ser. No. 14/533,247 filed on Nov. 5, 2014 and entitled "Tracking-Number Extraction Facilitating Administration of Access Codes;" Ser. No. 14/533,268 filed on Nov. 5, 2014 and entitled "System and Method for Detecting Potentially Unauthorized Access to an Enclosure;" Ser. No. 14/533,291 filed on Nov. 5, 2014 and entitled "System and Method for Communicating and Authenticating an Access Code"; and Ser. No. 14/533,324 filed on Nov. 5, 2014 and entitled "Access Code Administration and Sharing."

FIELD OF THE INVENTION

This invention relates to systems and methods for efficiently delivering goods to recipients, administering access codes to provide access to enclosures, and preventing unauthorized access to enclosures.

BACKGROUND

In modern transport and shipping networks, freight is shipped with relative efficiency between major ports, stations, or hubs using ships, airplanes, trains, trucks, or other vehicles of mass transport. This efficiency typically ends or is greatly reduced when goods reach their final port, station, or hub, where they need to be transported to their final destination. The last leg of delivery, frequently referred as the "last mile," is typically the most inefficient part of the journey, incurring by some estimates twenty-eight percent of the total shipping costs. This relative inefficiency is often referred to as the "last mile problem." The last mile problem exists not only in freight networks, but also in telecommunication, utility, and public transportation networks.

In freight networks, the last mile may be fraught with challenges not only in terms of delivering goods, but also ensuring that goods are delivered in a way that limits risk and/or cost to a retailer and/or shipping company. For example, if goods are left on a customer's doorstep but are stolen or damaged prior to retrieval by the customer, a retailer may be responsible to replace the goods, or have a policy to replace the goods to maintain customer relations. This may incur significant costs to the retailer. For this reason, some retailers may require a customer signature or other verification to indicate that a customer has taken possession of delivered goods, particularly for expensive or fragile items. Unfortunately, such a requirement may dramatically increase shipping costs. If a customer is not available to receive goods or provide a signature when a delivery agent arrives at his or her doorstep, the delivery agent may need to return one or more additional times to reattempt delivery. Statistics show that a high percentage of goods on delivery trucks are goods that were not successfully delivered on the initial try.

In view of the foregoing, what are needed are systems and methods to more efficiently deliver goods to recipients. In particular, systems and methods are needed to efficiently deliver goods to recipients even when recipients are unavailable to receive delivery. To facilitate such delivery, systems and methods are needed to efficiently administer access codes to enable delivery agents and other authorized users to access enclosures such as garages or reception boxes. Further needed are systems and methods to ensure that such access codes are administered in a safe and secure manner. Yet further needed are systems and methods to prevent unauthorized access to enclosures.

SUMMARY

The invention has been developed in response to the present state of the art and, in particular, in response to the problems and needs in the art that have not yet been fully solved by currently available systems and methods. Accordingly, systems and methods in accordance with the invention have been developed to more efficiently deliver goods to recipients, administer access codes to provide access to enclosures, and prevent unauthorized access to enclosures. The features and advantages of the invention will become more fully apparent from the following description and appended claims, or may be learned by practice of the invention as set forth hereinafter.

In a first embodiment of the invention, a method for more efficiently delivering goods to recipients is disclosed herein. Such a method includes obtaining a tracking number associated with an order of goods intended for delivery to a recipient. The method further includes obtaining an access code for association with the tracking number. The access code enables a delivery agent to gain access to an enclosure of the recipient for deposit of the goods therein. In certain embodiments, the access code is a temporary access code that expires once the delivery is fulfilled or the enclosure is accessed, thereby reducing the chance of unauthorized access to the enclosure. The method may also enable parameters (e.g., restrictions, constraints, conditions, etc.) regarding use of the access code to be established. A corresponding system is also disclosed.

In a second embodiment of the invention, a method for more efficiently delivering goods to recipients is disclosed. Such a method includes receiving a communication, such as an email or text message, containing a tracking number. The tracking number is associated with an order of goods intended for delivery to a recipient. The method extracts the tracking number from the communication and generates an access code for association with the tracking number. The access code enables a delivery agent to gain access to an enclosure of the recipient for deposit of the goods therein. In certain embodiments, the access code is derived from the tracking number, such as by using certain digits or portions of the tracking number to generate the access code. A corresponding system is also disclosed.

In a third embodiment of the invention, a method for detecting potentially unauthorized access to an enclosure is disclosed. Such a method includes detecting movement (e.g., opening and/or closing) of an access barrier of an enclosure. The method further detects whether a motor was used to move the access barrier. This may be accomplished, for example, by detecting electrical current drawn by the motor, vibration of the motor, voltage drop of electrical power supplied to the motor, rotation of the motor, or the like. In the event the access barrier was moved without using the motor, the method notifies a user, such as by sending an email or text message to the user. A corresponding system is also disclosed.

In a fourth embodiment of the invention, a method for more efficiently enabling access to an enclosure is disclosed. Such a method includes designating, on a computing device, an access code intended to enable access to an enclosure.

The method further communicates, over a network, a first copy of the access code to a control mechanism configure to control access to the enclosure. A second copy of the access code is communicated to an end user device configured to directly communicate the second copy to the control mechanism. In certain embodiments, the end user device wirelessly communicates the second copy to the control mechanism using a short distance communication protocol. A corresponding system is also disclosed.

In a fifth embodiment of the invention, a method for more efficiently enabling access to an enclosure is disclosed. Such a method includes designating an access code intended to enable access to an enclosure and identifying an end user for whom the access code is intended. The method automatically generates a communication addressed to the end user. The communication informs the end user that the access code has been established. In certain embodiments, the communication further informs the end user of any parameters that have been established for the access code. The method sends the communication to the end user using, for example, an email address or phone number of the end user. The method further communicates the access code to a control mechanism configured to control access to the enclosure. A corresponding system is also disclosed.

In a sixth embodiment of the invention, a method for more efficiently delivering goods to recipients is disclosed. Such a method includes generating an access code configured to enable access to an enclosure. The method further monitors a status of a delivery of goods intended for deposit in the enclosure. This may be accomplished, for example, by monitoring a package tracking system used to monitor and track delivery of the goods. In response to detecting fulfillment of the delivery, the method automatically causes the access code to expire. A corresponding system is also disclosed.

Various of the apparatus embodiments as described herein may include a global positioning system (GPS) receiver, a near-field communications (NFC) transmitter, a wireless transceiver, one or more hardware processors, and hardware memory. The hardware memory may store instructions that, when executed by the one or more hardware processors: receives a current geographic location of the apparatus via the GPS receiver; determines a range between the location and a delivery address; as the range is less than or equal to 1000 feet, sends a request via the wireless transceiver to a cloud-based server for a hash digest associated with a remote input receptor that controls access to the enclosure, wherein the cloud-based server and the remote input receptor store a cryptographic hash function that generates the hash digest based on an acceptable input for the remote input receptor; receives the hash digest via the wireless transceiver from the cloud-based server; and transmits the hash digest via the NFC transmitter to the remote input receptor, wherein the remote input receptor applies the cryptographic hash function to the hash digest to unmask the acceptable input and allows access to the enclosure. The transceiver my comprise a broadband microstrip antenna as disclosed in co-pending U.S. patent application Ser. No. 15/458,347, entitled Broadband Microstrip Antenna, to Hall et al., which is incorporated herein in its entirety for all that teaches and claims.

A computer program product is also described herein for enabling more efficient and secure access to an enclosure over other prior art solutions. The product may include: computer code for receiving a current geographic location of a device on which the computer program product is stored; computer code for determining a range between the coordinates and a delivery address; computer code for sending a request to a cloud-based server, as the range is less than or equal to 1000 feet, for a hash digest associated with a remote input receptor that controls access to the enclosure, wherein the cloud-based server and the remote input receptor store a cryptographic hash function that generates the hash digest based on an acceptable input for the remote input receptor; computer code for receiving the hash digest from the cloud-based server; and computer code for transmitting the hash digest to the remote input receptor, wherein the remote input receptor applies the cryptographic hash function to the hash digest to unmask the acceptable input and actuates the remote input receptor upon unmasking the acceptable input.

A cloud-based server is also described herein that may enable more efficient and secure access to an enclosure. The server may include one or more hardware processors and hardware memory. The hardware memory may store a cryptographic hash function that generates, when processed by the processors in conjunction with an acceptable input, a hash digest based on the acceptable input for a remote input receptor that controls access to the enclosure. The hardware memory may also store instructions that, when executed by the one or more hardware processors: receives a request from a remote user device for the hash digest, wherein the remote user device indicates in the request proximity within a range less than or equal to 1000 feet between the remote user device and a delivery address of the enclosure; and transmits the hash digest to the remote user device, wherein the remote user device transmits the hash digest to the remote input receptor, and wherein the remote input receptor applies the cryptographic hash function to the hash digest to unmask the acceptable input and actuate the remote input receptor upon unmasking the acceptable input.

Various of the apparatus embodiments as described herein may include a wireless transmitter, a wireless transceiver, a global positioning system (GPS) receiver, a near-field communications (NFC) transmitter, one or more hardware processors, and hardware memory. The wireless transmitter may be disposed in a container having at least one side selectably transparent to radio frequency (RF) transmissions, the other sides of the enclosure opaque to RF transmissions. Each of the wireless transceiver, the GPS receiver and the NFC receiver may be disposed outside the container. The hardware memory may store instructions that, when executed by the one or more hardware processors: receives a current geographic location of the apparatus via the GPS receiver; determines a range between the location and a delivery address; as the range is less than or equal to 1000 feet, sends a request via the wireless transceiver to a cloud-based server for a hash digest associated with a remote input receptor that controls access to the enclosure, wherein the cloud-based server and the remote input receptor store a cryptographic hash function that generates the hash digest based on an acceptable input for the remote input receptor; receives the hash digest via the wireless transceiver from the cloud-based server; as the NFC receiver detects the apparatus is within a distance less than or equal to 8 inches, converts the selectably transparent side of the container from RF opaque to RF transparent; and transmits the hash digest via the wireless transmitter to the remote input receptor, wherein the remote input receptor applies the cryptographic hash function to the hash digest to unmask the acceptable input and allows access to the enclosure.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 9A-H show various exemplary pages of an application for administering access codes;

DETAILED DESCRIPTION

Figure 1:
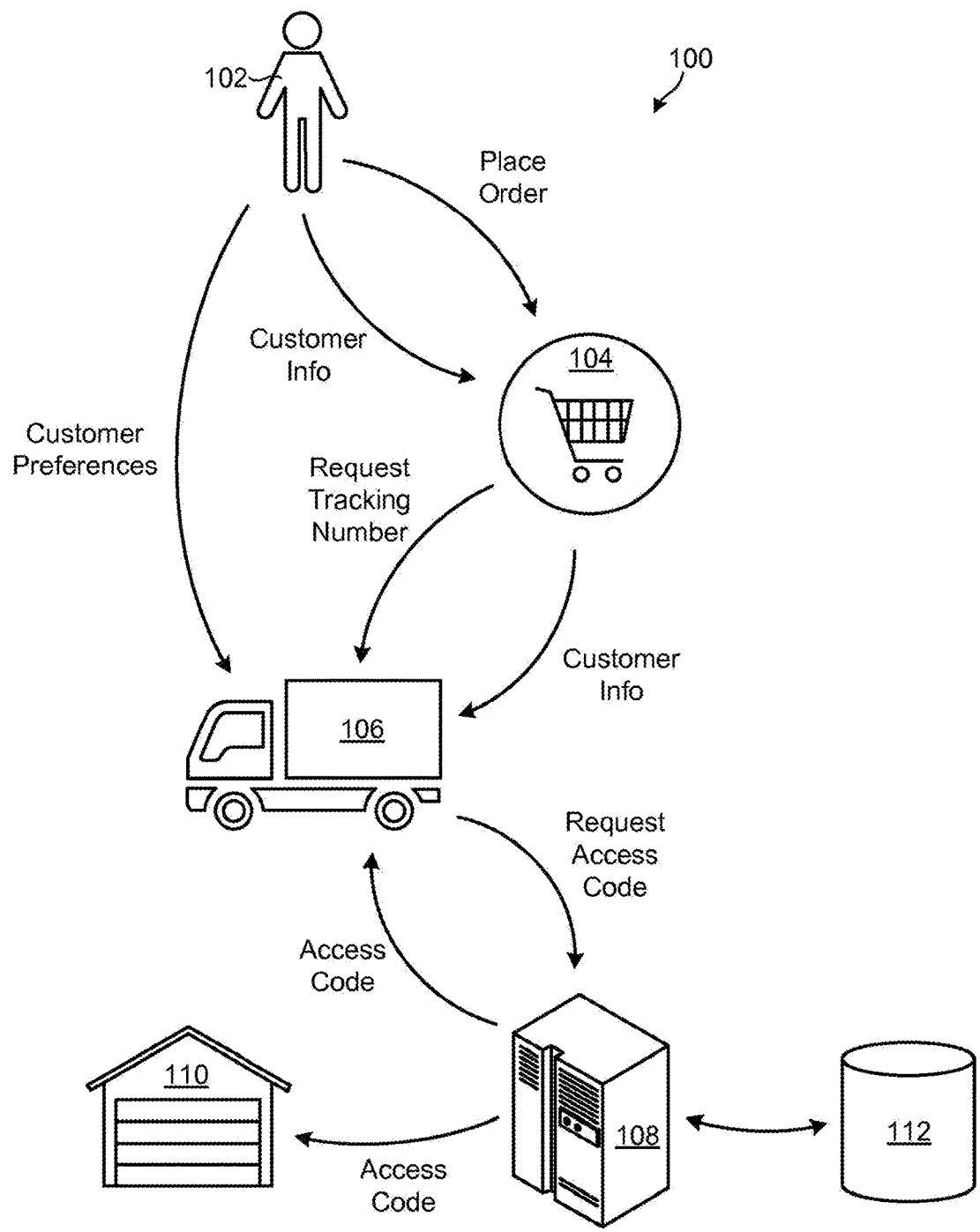
FIG. 1 is a high-level view of a first embodiment of a delivery fulfillment system in accordance with the invention.

It will be readily understood that the components of the present invention, as generally described and illustrated in the FIGs. herein, could be arranged and designed in a wide variety of different configurations. Thus, the following more detailed description of the embodiments of the invention, as represented in the FIGs., is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, a high-level view of one embodiment of a delivery fulfillment system 100 in accordance with the invention is illustrated. Such a delivery fulfillment system 100 may be helpful in reducing inefficiencies associated with delivering goods over the "last mile," as previously discussed. As shown, in the illustrated embodiment, a customer 102 may initially place an order for goods with a merchant 104, such as an online merchant 104. In certain embodiments, when generating an order, the merchant 104 may gather information about the customer 102 (i.e., recipient 102), such as name, address, payment information, and the like. Alternately, the merchant 104 may receive authentication information from the customer 102 that enables the merchant 104 to retrieve previously stored information about the customer 102. Once customer information is received and an order is completed, the merchant 104 may decide to fulfill the order as a single shipment or divide the order into multiple shipments depending on the logistics for fulfilling the order. For each shipment, the merchant 104 may obtain a tracking number. In certain embodiments, such a tracking number may be requested from a shipper 106 tasked with delivering goods associated with the order. This tracking number may enable a shipment to be monitored and tracked as it moves from the merchant 104 to the customer 102.

In order to reduce inefficiencies associated with last-mile delivery, it may be advantageous to enable delivery agents to deliver goods in a safe and secure manner regardless of whether a customer is present when a delivery agent arrives. For example, if a delivery agent arrives at a customer's doorstep to deliver a package only to find that the customer is not present, the delivery agent may need to return the next day or leave the package at the customer's doorstep. In some cases, leaving the package at the customer's doorstep is not an option. For example, some goods may be sufficiently fragile, expensive, or sensitive that a merchant 104 may require verification (e.g., a signature, etc.) that goods have been received by a customer 102.

On the other hand, a merchant may be more inclined to allow unattended delivery if goods could be left in a safe and secure location. For example, if goods could be left in an enclosure such as a garage, reception box, gated area, warehouse, or other secure enclosure, a merchant may be more inclined to allow unattended delivery of fragile, expensive, or sensitive items. On the other hand, customers may be reluctant to allow delivery agents to access secure enclosures such as garages when they are not present due to the potential for theft, compromises in personal security, or other reasons. Other issues, such as how and under what circumstances access would be granted to a delivery agent, may also need to be addressed before a customer feels comfortable allowing access to a secure enclosure. Thus, it would be an advance in the art to enable unattended delivery into secure enclosures while simultaneously addressing issues with respect to theft, personal security, and the like. One embodiment of such a system is illustrated in FIG. 1.

In certain embodiments in accordance with the invention, a server 108 may be established to provide a temporary access code to a shipper 106 in exchange for a tracking number. For example, assuming a customer 102 has agreed to such an arrangement, upon generating or receiving a tracking number for a particular shipment, the shipper 106 may provide the tracking number and customer information (such as a customer ID) to the server 108. The server 108 may, in turn, return an access code to the shipper 106 which is linked to the tracking number. In certain embodiments, a database 112 coupled to the server 108 may store information such as customer information (such as a customer ID), each tracking number associated with the customer, the access code associated with each tracking number, parameters associated with each access code, and the like.

In addition to providing the access code to the shipper 106, the server 108 may communicate with and program an access mechanism (e.g., a garage door opening mechanism) of a customer's enclosure 110 (e.g., garage) with the access code. This may include establishing any parameters (e.g., constraints, limitations, etc.) associated with using the access code. Communication may occur over the Internet, a wide-area-network, a cell-phone-network, or other suitable network. When a delivery agent arrives at the delivery site (a customer's home, business, etc.), the delivery agent may gain access to the customer's enclosure 110 using the access code, thereby allowing a package or other goods to be deposited therein. The enclosure 110 may then be secured (by closing an access barrier, or door, of the enclosure 110). In certain cases, a shipper 106 (or merchant 104) may allow a customer 102 to establish certain customer preferences, such as allowing the customer 102 to opt in to the aforementioned unattended delivery service.

Instead of generating an access code that provides indefinite access to an enclosure 1 10, the access code may be temporary such that it will automatically expire at a specified time or in response to a specified event. For example, the access code may be a single-use access code that expires after a single use or a multiple-use access code that expires after a specified number of uses. In other embodiments, the access code automatically expires when a particular shipment is fulfilled. That is, when a particular shipment is designated as "delivered" or "fulfilled" in a package tracking system or other database, the access code may automatically expire. Thus, systems and methods in accordance with the invention may in certain embodiments be configured to monitor the status of a shipment of goods using a package tracking system or a database used to track a package's delivery status. The package tracking system could be a proprietary system or one generally available, such as over the Internet.

In yet other embodiments, an access code may be configured to expire after a specified amount of time (e.g., two weeks) has passed. Combinations of the above criteria or other criteria may also be used to determine when an access code expires. For example, an access code may be configured to expire after it is used a single time or after two weeks, whichever comes sooner. In another example, an access code may be configured to expire after a tracking number associated with the access code is designated as "fulfilled" or after two weeks, whichever comes sooner. In this way, access to an enclosure 110 may be granted on a temporary basis as opposed to an indefinite basis, thereby preventing or reducing the chance that the access code will be used for unauthorized access to the enclosure 110 as well as providing peace-of-mind for a customer.

Other parameters are also possible and within the scope of the invention. For example, an access window may be established for an access code such that the access code will only enable access to an enclosure 110 between certain times of the day, on certain days of the week, or the like. In certain embodiments, an access window may be established around an estimated delivery date for a shipment. For example, an access window may be established two days before and after an estimated delivery date to provide a shipper 106 some leeway when delivering a package. Other methods for determining a suitable access window are also possible and within the scope of the invention.

In certain embodiments, use of an access code may be configured to trigger various notifications. For example, when an access code is used to gain access to an enclosure 110, a notification may be sent to a customer 102 associated with the enclosure 110 indicating that the access code has been used. This may inform the customer 102 that a particular package or shipment has arrived as well as alert the customer 102 to any irregularities or possible unauthorized access. In certain embodiments, the amount of time an enclosure 110 is open may be monitored to ensure that unauthorized activities are not occurring. For example, if a typical delivery takes one minute to open an enclosure, deposit a package, and close the enclosure, an alert may be sent if the enclosure is open for more than one minute. Notifications may also be sent anytime an access code is used to attempt to gain access to an enclosure 110, even if access is not ultimately granted. In this way, an individual 102 may continually monitor access or attempts to access an enclosure 110.

In certain embodiments, data stored by the server 108 and database 112 may be specially configured to protect customer information. For example, a customer ID number (as opposed to a name and/or address) may be used to identify a customer in the database 112. This customer ID may be linked to specific tracking numbers and access codes, as well as a network address for communicating with an access mechanism (e.g., a garage door opening mechanism) of the customer. Thus, the names and/or addresses of customers may be omitted from the database 112. Thus, if a hacker were to overcome security measures to gain access to the server 108 and/or database 112, the hacker would be unable to acquire substantial sensitive information about the customer, or have difficulty linking information in the database 112 to the customer. In certain embodiments, a zip code may be stored for each customer ID in the database 112 to allow the server 108 to determine a time zone in which the customer 102 resides. This may allow the server 108 to enforce access windows, expiration times, or other time- or date sensitive parameters associated with access codes.

In certain cases, the merchant 104 and shipper 106 illustrated in FIG. 1 may be a single business entity, or commonly-owned business entities 104, 106. For example, a merchant 104 may provide a shipping service that delivers goods directly to customers 102. In such cases, the merchant 104 and shipper 106 illustrated in FIG. 1 may act as a single entity. It follows that communications between the merchant 104 and shipper 106 may be unneeded in such embodiments. In any event, the single entity (merchant 104 and shipper 106 combined) may communicate with the server 108 and database 112 in substantially the same way described above.

Figure 2:
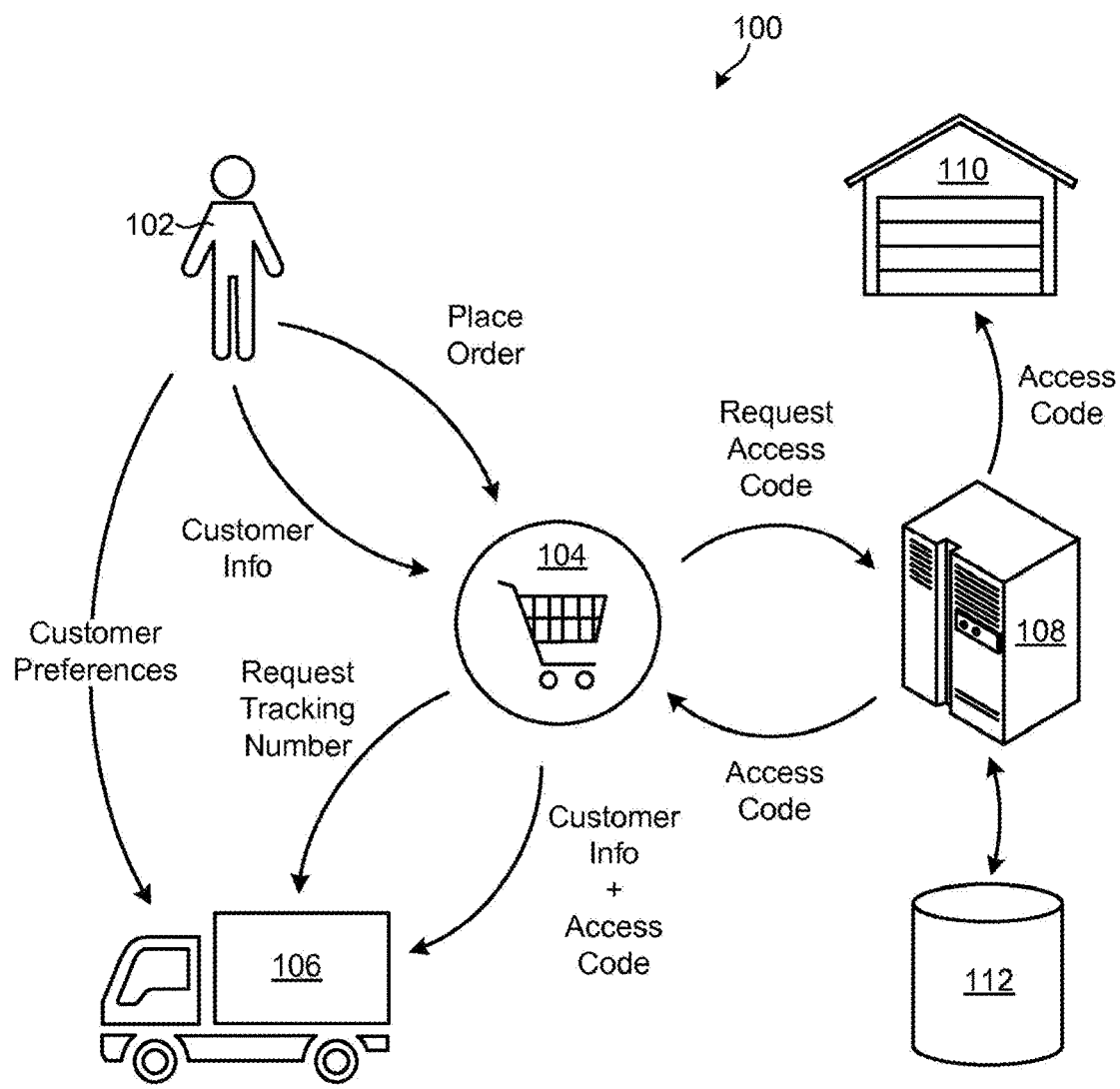
FIG. 2 is a high-level view of a second embodiment of a delivery fulfillment system in accordance with the invention.

Referring to FIG. 2, a high-level view of another embodiment of a delivery fulfillment system 100 in accordance with the invention is illustrated. This embodiment is similar to the embodiment illustrated in FIG. 1 except that a merchant 104, instead of a shipper 106, procures an access code from the server 108. Once an order is complete, the merchant 104 may request a tracking number from the shipper 106 or generate or obtain a tracking number on its own. Using the tracking number, the merchant 104 may request an access code from the server 108. Once the access code is received, the merchant 104 may provide the access code to the shipper 106 for use with the tracking number. The server 108, in turn, may communicate with and program an access mechanism (e.g., garage door opening mechanism) of the customer's enclosure 110 (e.g., garage) with the access code. This may include designating any parameters associated with using the access code. The embodiment described in FIG. 2 may be more feasible in situations where the merchant 104 may be working with multiple shipping companies, or may be shipping some goods itself while outsourcing the shipment of other goods to other companies. By procuring the access code itself, the merchant 104 may decide how and to whom to distribute the access code.

Figure 3:
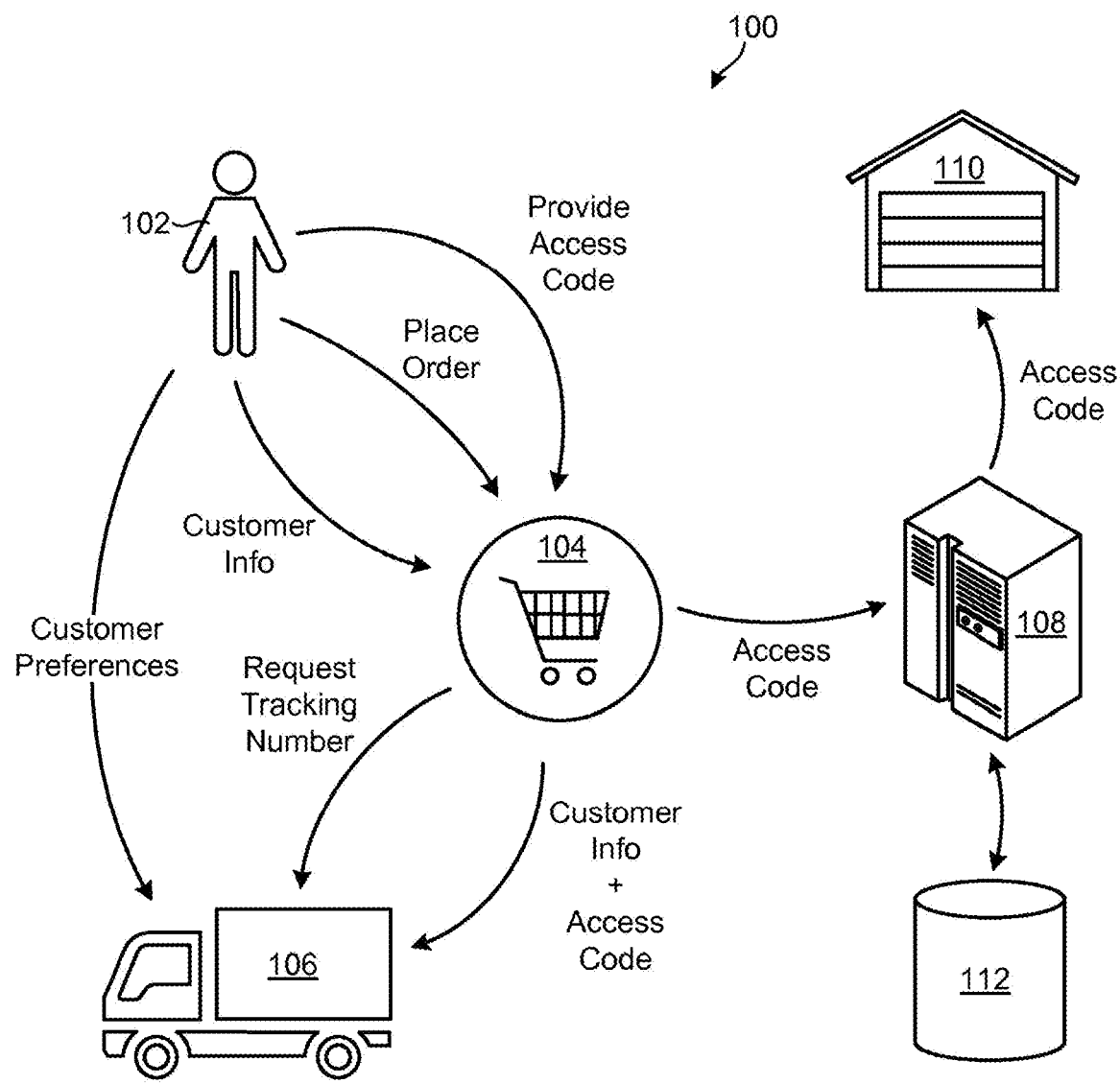
FIG. 3 is a high-level view of a third embodiment of a delivery fulfillment system in accordance with the invention.

Referring to FIG. 3, a high-level view of another embodiment of a delivery fulfillment system 100 in accordance with the invention is illustrated. In this embodiment, an access code or authorization to generate an access code is procured from a customer 102 as opposed to being automatically generated by a server 108. For example, when a customer 102 completes an order, the customer 102 may be queried if he or she would like to assign an access code to the order. If affirmative, the customer 102 may provide an access code to the merchant 104 for use with the order. Alternatively, an access code may be automatically generated on behalf of the customer 102, such as by the merchant 104. This access code may be provided to a shipper 106 for use with a tracking number. The access code may also be provided to a server 108 which may in turn communicate with and program an access mechanism of the customer's enclosure 110. Alternatively, the customer may program the access mechanism with the access code using an access-code-management application, as will be explained in more detail hereafter. Like the previous examples, the access code may expire at designated time or in response to a designated event (e.g., one or more uses of the access code). Use of the access code may also be limited by various parameters, as previously discussed.

Figure 4:
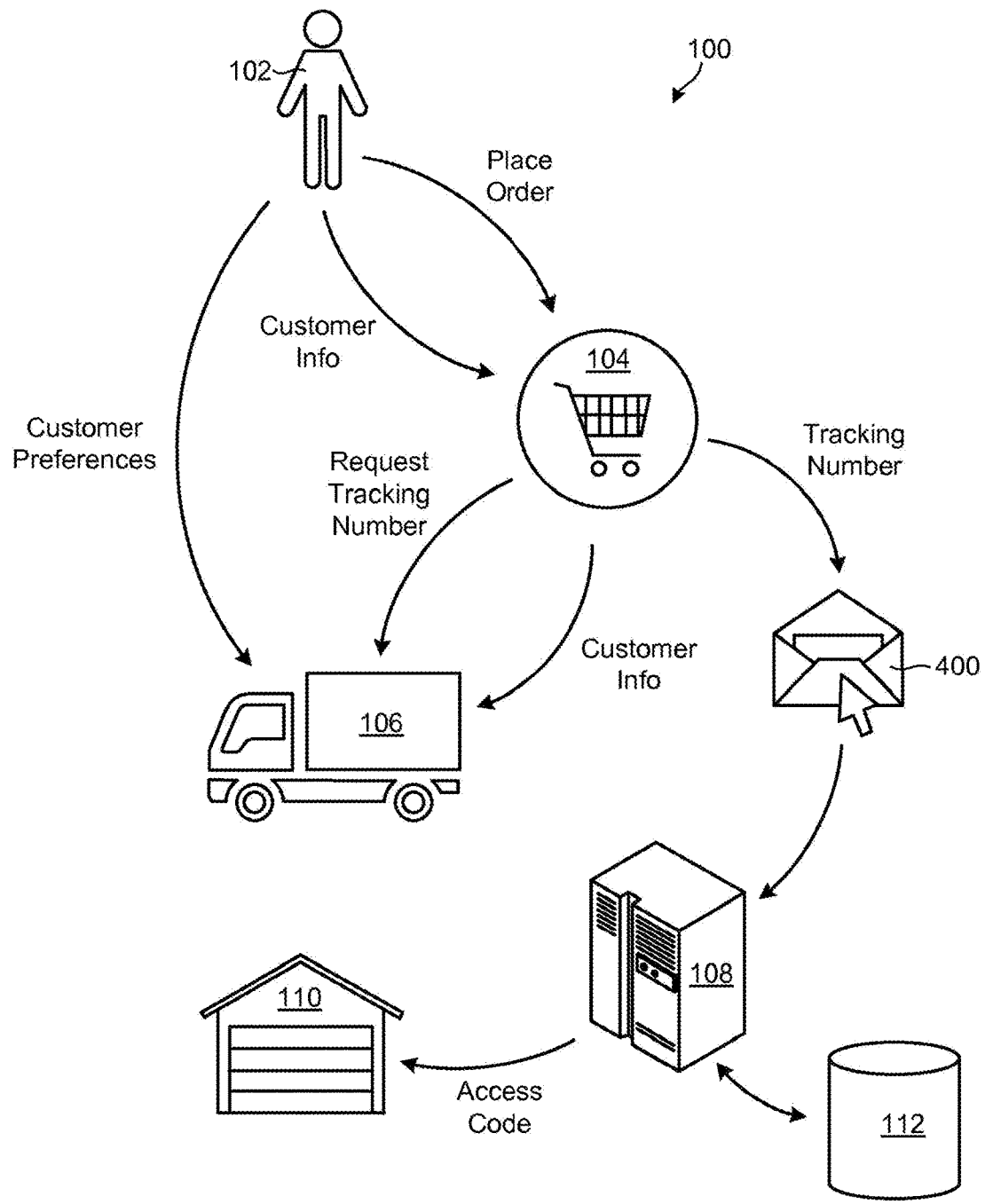
FIG. 4 is a high-level view of a fourth embodiment of a delivery fulfillment system in accordance with the invention.

Referring to FIG. 4, in certain cases, it may be advantageous to provide a delivery fulfillment system 100 that bypasses one or more of a merchant 104 and shipper 106. Such a delivery fulfillment system 100 may provide the features and benefits discussed above without requiring buy in from a merchant 104 and/or shipper 106. In certain embodiments, such a system 100 may rely on communications 400 sent by merchants 104 in response to orders or purchases. For example, many merchants 104 will send one or more confirmation emails or texts to a customer 102 indicating details of an order as well as a tracking number associated with the order. A copy of such communications 400 may be sent or forwarded to a server 108 in accordance with the invention. In certain embodiments, a customer 102 may add a server address (email address, text address, etc.) to a list of recipients that receive alerts or notifications when an order is placed or shipped. The server 108 may in turn extract a tracking number from one or more of the communications 400 and generate an access code associated with the tracking number. In certain embodiments, the access code is derived from the tracking number. For example, the access code may be the last n (e.g., three or four) digits of the tracking number. The server 108 may in turn program an access mechanism of the customer's enclosure 110 with the access code.

When a delivery agent arrives at the customer's location, the delivery agent may be instructed (by a note or other means) to deposit the shipment into the customer's enclosure 110. The delivery agent may also be instructed on how to derive the access code from the tracking number. Alternatively, the customer 102 may establish customer preferences with the shipping company 106 that directs the delivery agent to use the last n digits of a tracking number (or derive the access code from the tracking number in some other way) to access the customer's enclosure 110 for deposit of goods therein. Other methods for communicating an access code to a delivery agent, such as downloading an access code directly to a delivery agent's mobile or handheld device, are also possible and within the scope of the invention.

Figure 5:
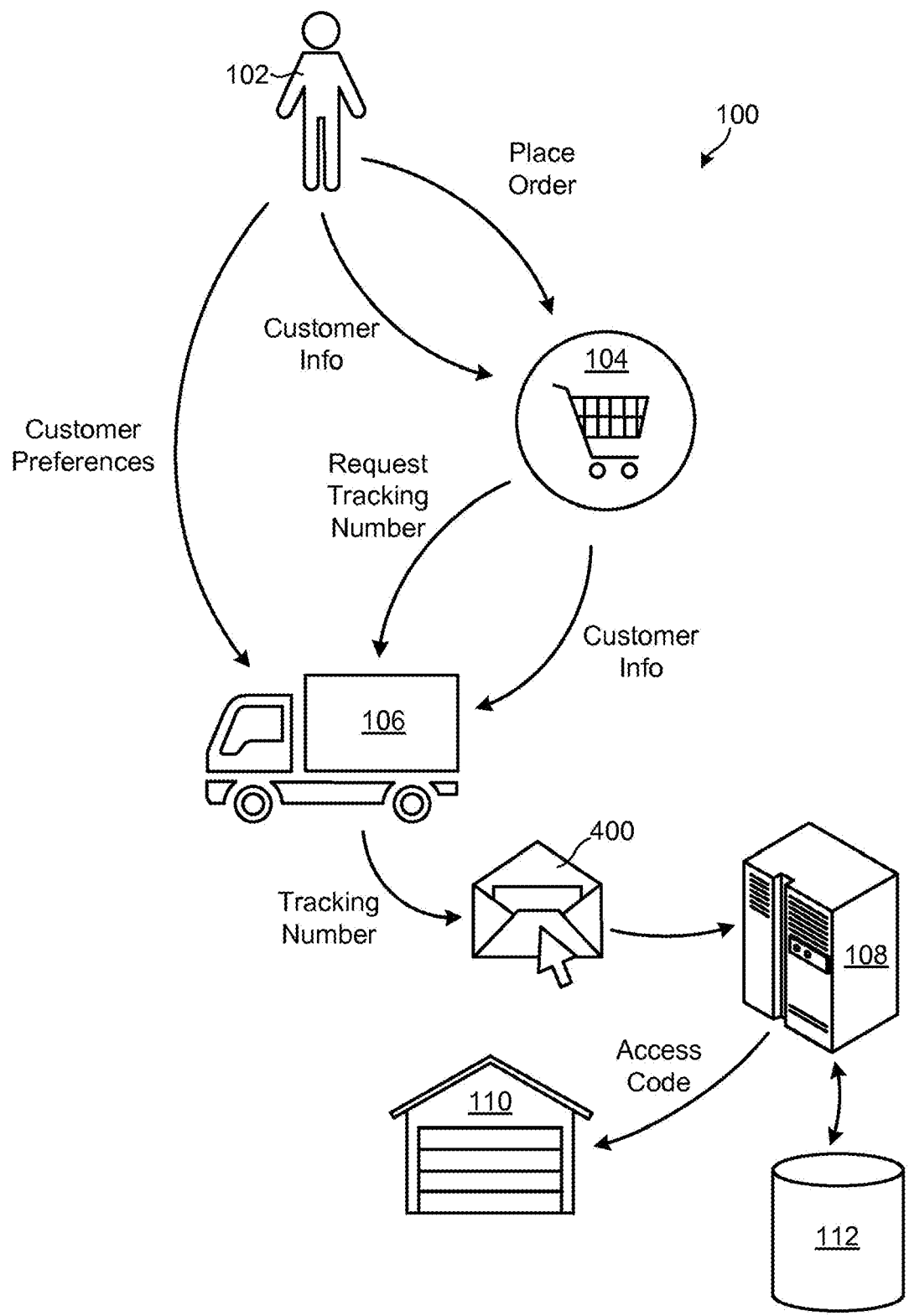
FIG. 5 is a high-level view of a fifth embodiment of a delivery fulfillment system in accordance with the invention.

Referring to FIG. 5, in other embodiments, a delivery fulfillment system 100 in accordance with the invention may be configured to receive and extract customer information and tracking numbers from communications 400 originating from a shipper 106. For example, various shippers 106 may allow customers 102 to establish shipping preferences, such as when and where shipments are delivered, what types of alerts and notifications are generated, and the like. These preferences may be set to provide communications 400 to a server 108 in accordance with the invention. Alternatively, a customer 102 may forward or send communications 400 received from the shipper 106 to the server 108. The server 108 may in turn extract relevant information, such as customer identifiers and tracking numbers, from the communications 400. These customer identifiers and tracking numbers may in turn be used to generate access codes, which may be used to program the access mechanisms of customer enclosures 110.

Figure 6:
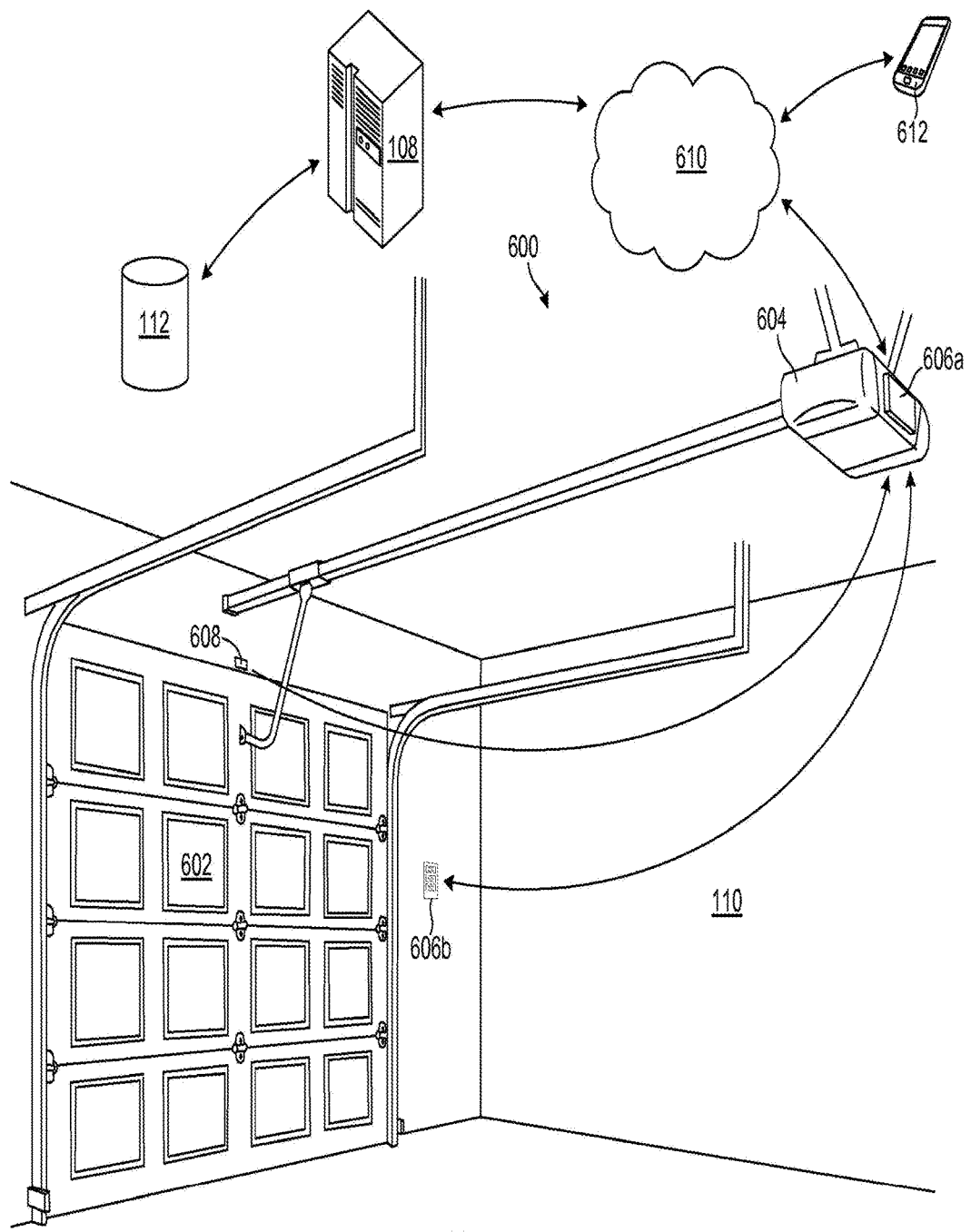
FIG. 6 is a perspective view of one embodiment of an enclosure, in this example a garage, using a programmable access mechanism to control access thereto.

Referring to FIG. 6, as previously mentioned, a delivery fulfillment system 100 in accordance with the invention may be configured to program an access mechanism of a customer's enclosure 110. FIG. 6 shows one embodiment of an access mechanism 600, in this example a garage door opening mechanism 600, configured to control access to a garage 110. In the illustrated embodiment, the garage door opening mechanism 600 includes a garage door opener 604 and a control mechanism 606. In this example, the control mechanism 606 includes a control module 606a and an input device 606b (such as a keypad 606b). To open the garage door 602, a user may input an access code into the input device 606b. This access code may be transmitted to the control module 606a where it may be compared to one or more stored access codes that have been programmed into the control module 606a. If the entered access code matches a stored access code and any parameters associated with the stored access code are satisfied, the control module 606a may cause the garage door opener 604 to open the garage door 602. On the other hand, if the entered access code does not match a stored access code or the entered access code matches a stored access code but does not comply with one or more parameters associated with the stored access code, the control module 606a may deny entry to the garage 110.

As shown, the server 108 may communicate with the control module 606a over a network 610 such as the Internet. In certain embodiments, the control module 606a is configured with a wired or wireless adapter to enable communication with a router or other device (hub, gateway, access point, etc.) connected to the Internet. Communication may occur using a protocol or technology such as WIFI or other radio frequencies such as proprietary RF protocols. In other embodiments, the control module 606a may communicate with a home automation system and receive data and/or control signals from a home automation controller or through a home automation controller connected to the Internet. In such embodiments, a home automation protocol such as Zigbee® or Z-Wave® may be used. In certain embodiments, such communication protocols may be used not only to communicate with the server 108, but also to enable communication between the input device 606b, control module 606a, and/or garage door opening mechanism 600.

The server 108 may program the control module 606a with access codes to enable access to the garage 110. The server 108 may also have the ability to remove access codes that are programmed into the control module 606a. Access codes that are programmed into the control mechanism 606 may also be configured to automatically expire at designated times and/or in response to designated events without intervention by the server 108. Once programmed, the control mechanism 606 may be configured to compare entered access codes with stored access codes as well as enforce parameters associated with the stored access codes.

The control mechanism 606 (including the control module 606a and input device 606b) illustrated in FIG. 6 is advantageous in that it may be easily retrofitted to existing garage door openers 604. Because existing garage door openers 604 may use different wireless communication protocols to enable remote control and communication, providing an input device 606b that supports all or most wireless communication protocols may be costly and overly complex. By implementing the control mechanism 606 as an input device 606b and control module 606a, a single wireless communication protocol may be used between the input device 606b and control module 606a. The control module 606a, which may be located on or proximate a garage door opener 604 may actuate the garage door opener 604 in the same or similar way as a wired switch. Thus, implementing the control mechanism 606 as two components (a control module 606a and input device 606b) may eliminate or reduce compatibility problems with various wireless communication protocols. Nevertheless, in other embodiments, the input device 606b may be configured to communicate in the native wired or wireless communication protocol of existing garage door openers, such as in embodiments where the control mechanism 606 is implemented entirely within the input device 606b.

Implementing the control mechanism 606 as a separate input device 606b and control module 606a may also allow the input device 606b to operate in a very low power state when not being used. In some cases, a wired power source may not be readily available to the input device 606b, thereby making battery power necessary. Keeping the input device 606b in a very lower power state when not in use may substantially extend battery life. The control module 606a, by contrast, due to its proximity to a garage door opener 604 or its position within a garage 110, may have more ready access to a wired power source (possibly the same power source as a garage door opener 604), thereby making power consumption less of a concern.

In certain embodiments, the input device 606b is used primarily to receive access codes from users. These access codes may be transmitted to the control module 606a where they may be compared to acceptable access codes to either permit or deny entry to the enclosure 110. In such embodiments, much of the functionality and/or processing power of the control mechanism 606 may be incorporated into the control module 606a as opposed to the input device 606b. In other embodiments, however, sufficient processing power and/or functionality may incorporate into the input device 606b to allow access codes to be stored and compared at the input device 606b. For example, in certain embodiments, much or all the functionality of the control module 606a may be incorporated into the input device 606b. In certain embodiments, the control module 606a may be eliminated entirely by incorporating all functionality into the input device 606b.

In yet other embodiments, certain functionality associated with the control module 606a may be performed by the server 108. For example, access codes entered at the input device 606b may be transmitted to the server 108 where they may be compared to one or more access codes stored in the database 112. If the access codes match and any parameters with the access codes are satisfied, the server 108 may remotely control (e.g., open, close) the garage door 602. Centralized control at the server 108 may provide various benefits (centralized management of hardware, software, customer data, etc.) but also have drawbacks associated with centralized control. For example, centralized control may require a reliable network connection between the server 108 and garage door opening mechanism 600. Interruptions or latency in the network may impair the ability of the server 108 to receive access codes from the input device 606b as well as remotely control the garage door opening mechanism 600.

As shown in FIG. 6, in certain embodiments, an access mechanism 600 in accordance with the invention may include one or more sensors 608. In certain embodiments, a sensor 608 may be configured to detect a position or movement of an access barrier 602, such as a garage door 602. This may allow the server 108, control module 606a, or other components (such as a customer's mobile device 612 or computing system 612) to determine if the garage door 602 is open or closed at any given time. In certain embodiments, the sensor 608 may also be configured to sense if the access barrier 602 is transitioning from an open to a closed position, or vice versa, at any given time. Such a sensor 608 may enable components such as the server 108 and control module 606a to make decisions based on the current and intended position of the access barrier 602. In certain embodiments, the sensor 608 may also be used to determine whether an access barrier 602 has been opened without authorization, such as in case of a break in, as will explained in more detail hereafter.

As further shown in FIG. 6, in certain embodiments, a customer device 612, such as a mobile device 612 or computing system 612, may communicate with the control mechanism 606. In certain embodiments, an access-code-management application or other functionality on the customer device 612 may allow access codes to be added to, modified, or removed from the control module 606a. In certain embodiments, the customer device 612 may communicate directly with the control module 606a. In other embodiments, the customer device 612 may communicate with a centralized server 108, which may in turn communicate with the control module 606a.

The access-code-management application on the customer device 612 may also include functionality to enable the customer 102 to establish parameters for access codes programmed into the control module 606a. These parameters may include, for example, a number of times an access code may be used prior to expiration, an amount of time the access code is valid prior to expiration, days or times when the access code may be used, or the like. For example, a customer 102 may wish to program the control mechanism 606 with a temporary access code to enable a house cleaner or repairman to temporarily access the customer's enclosure 110. The customer 102 may only wish to grant access during business hours on a specific day or days of the week. The customer 102 may also want the temporary access code to expire after a week even if it is never used. The access-code-management application may enable the customer 102 to program the control module 606a with a temporary access code having one or more of the aforementioned parameters. The access-code-management application may also allow the customer 102 to retire access codes that are no longer needed. Using the above-described functionality, a customer 102 may assign different access codes to different people and manage the access codes separately. This eliminates the need to share more permanent access codes (perhaps an access code used by the customer 102 and/or family members) with persons who may only require access on a temporary basis or on specific days or times. The ability to perform such on a mobile device 612 or computing device 612 also allows a customer 102 to manage the access codes using a more advanced interface as well as manage such remotely.

Figure 7:
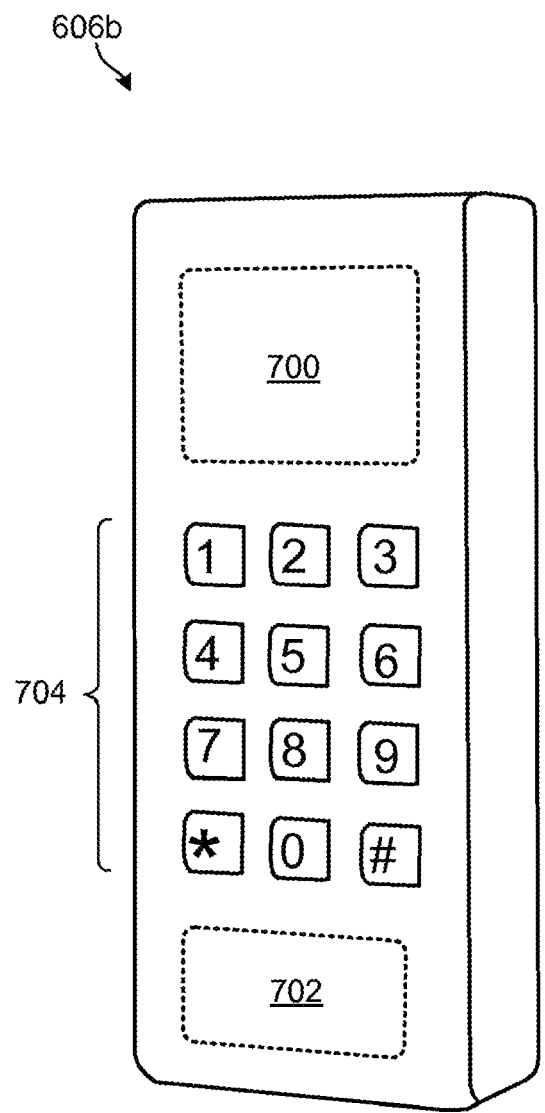
FIG. 7 shows one embodiment of an input device for receiving an access code.

Referring to FIG. 7, one embodiment of an input device 606b in accordance with the invention is illustrated. As shown, the input device 606b is embodied as a keypad 606b, although other types of input devices 606b may also be used. Where a keypad 606b is used, a user may enter an access code by pressing one or more keys 704 in a particular sequence. As previously discussed, in certain embodiments, the input device 606b may wake up upon receiving the access code. The access code may be forwarded to the control module 606a previously described, where the access code may be compared to one or more acceptable access codes. Alternatively, the input device 606b may receive the access code and compare the access code to one or more acceptable access codes at the input device 606b. If a match is found and any parameters associated with the matching access code are satisfied (e.g., the access code has not expired and/or the access code was entered during an acceptable access window), the control module 606a may actuate the access mechanism 600, causing the access mechanism 600 to open the access barrier 602.

Other or additional methods for receiving access codes may also be incorporated into the input device 606b. For example, instead of manually inputting an access code, a user may wirelessly communicate an access code to the input device 606b using, for example, a mobile computing device (e.g., smart phone, etc.). In such an embodiment, the access code may be communicated to the input device 606b using a short distance communication protocol such as Near Field Communication (NFC) or Bluetooth™. To enable such communication, the input device 606b may include a reader 700 incorporating NFC, Bluetooth™, or other wireless functionality. To wake up the input device 606b, the mobile computing device may, in certain embodiments, be tapped against the input device 606b. The input device 606b may, in turn, include an accelerometer, vibration, or other motion sensing device to sense contact from the mobile computing device and wake up other functionality of the input device 606b. In this way, the input device 606b may be kept in a very low power state when not in use.

In other embodiments, the input device 606b may include scanning functionality, such as an optical or RFID scanner 702, to scan a tag or label storing the access code. The access code may be represented or stored in a bar code, matrix code, chip, integrated circuit, magnetic strip, or the like. The tag or label may, in certain embodiments, be physically attached to a package or other goods to be delivered into the enclosure 110. One benefit of storing the access code in a mobile computing device, tag, or label, is that the access code may be more difficult to copy or transfer. It may also enable a delivery agent to access an enclosure 110 without having actual knowledge of the access code. This, in turn, may provide greater security and reduce or prevent unauthorized use of the access code.

Figure 8A:
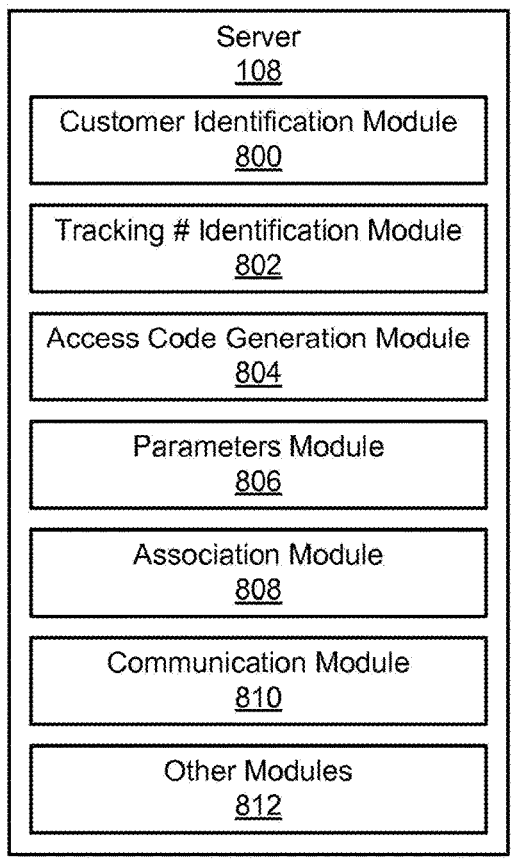
FIGS. 8A-C show various modules that may be incorporated into a server, control mechanism, and customer device in accordance with the invention.
Figure 8B:
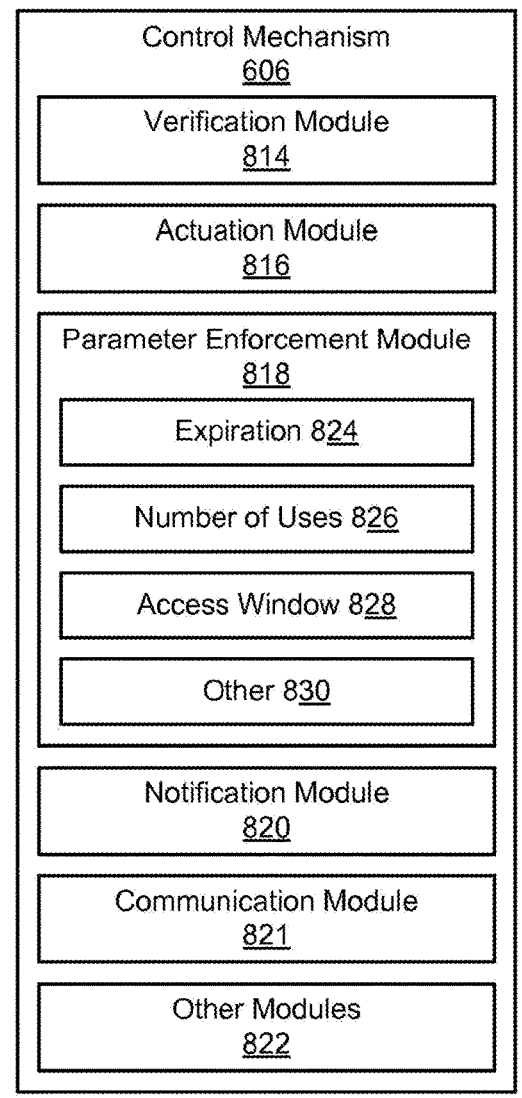
Figure 8C:
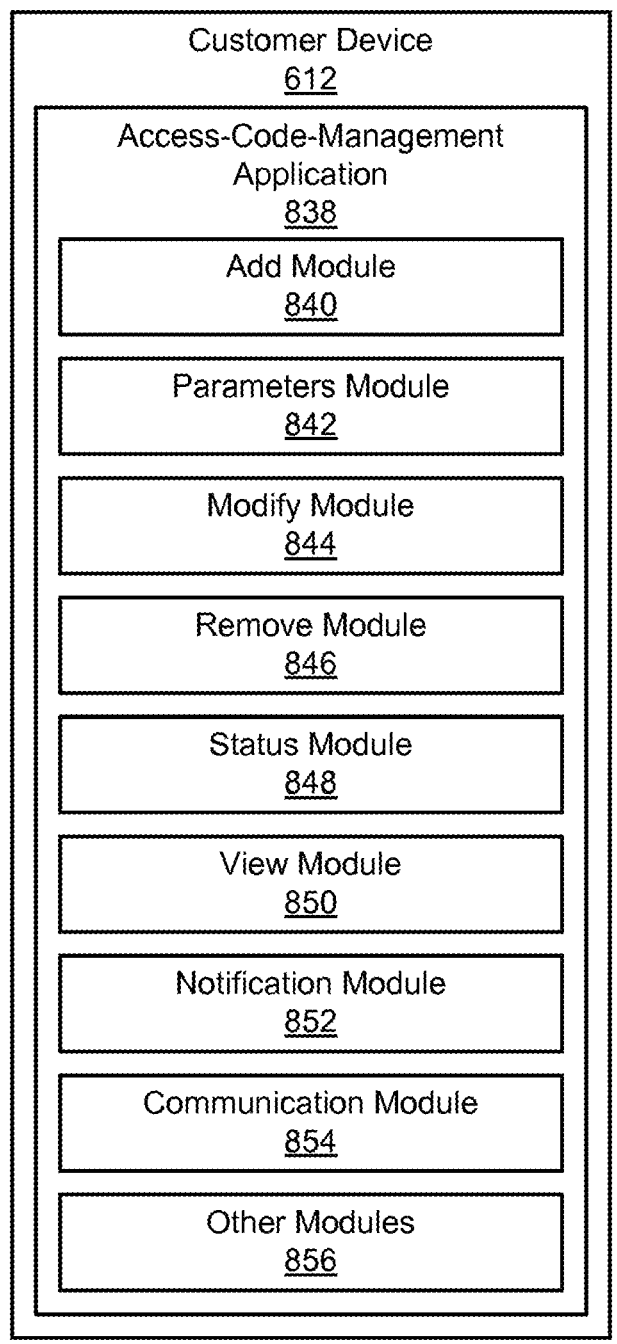

Referring to FIGS. 8A-C, the features and functions described above may be implemented in the form of one or more modules running on the server 108, control mechanism 606 (which may include the control module 606a and/or input device 606b), and customer device 612. These modules may be implemented in hardware, software, firmware, or a combination thereof. The modules, as well as their locations, are presented only by way of example and not limitation. Other modules are possible or the functionality of the modules may be organized differently in various embodiments. The modules are not necessarily tied to the locations where they are illustrated. For example, certain functionality shown in the server 108 may, in certain embodiments, be implemented in the control mechanism 606 or customer device 612, or vice versa. Other functionality shown in a single location may, in certain embodiments, be distributed across multiple locations, such as across the server 108 and control mechanism 606. Thus, the illustrated modules and their locations are presented only by way of example and not limitation.

As shown in FIGS. 8A and 8B, in certain embodiments, a server 108 in accordance with the invention may include one or more of a customer identification module 800, a tracking number identification module 802, an access code generation module 804, a parameters module 806, an association module 808, a communication module 810, and other modules 812. The control mechanism 606 (including the control module 606a and/or input device 606b), on the other hand, may include one or more of a verification module 814, an actuation module 816, a parameter enforcement module 818, a notification module 820, a communication module 821, and other modules 822.

A customer identification module 800 may identify a customer 102 associated with a selected tracking number. In certain embodiments, the customer 102 is identified by a unique customer ID. The customer ID may allow a tracking number to be associated with a customer as well as allow an access code associated with the tracking number to be programmed into an access mechanism 600 of the customer. Thus, the customer ID may, in certain embodiments, have a network address associated therewith, where the network address enables communication with an access mechanism 600 of the customer's enclosure 110. In certain embodiments, the customer ID is an esoteric ID that would prevent a hacker or intruder from specifically identifying a customer 102 associated with the customer ID.

A tracking number identification module 802 may identify a tracking number associated with the customer 102. In certain embodiments, this tracking number is received directly from a merchant 104 or shipper 106. In other embodiments, the tracking number is extracted from a communication 400, such as an email or text, directed to a customer 102 of the merchant 104 or shipper 106. Once a tracking number is identified, an access code generation module 804 may generate an access code associated with the tracking number. In certain embodiments, the access code generation module 804 derives the access code from the tracking number, such as by using selected digits (e.g., the last three or four digits) of the tracking number. In other embodiments, the access code generation module 804 randomly generates the access code or generates the access code using an algorithm unrelated to the tracking number. Alternatively, or additionally, the access code generation module 804 may enable a user to designate the access code.

A parameters module 806 may enable various parameters to be established for an access code. For example, the parameters module 806 may designate a date and/or time the access code will expire. Alternatively, or in addition, the parameters module 806 may designate an event or events that may cause the access code to expire. For example, the access code may expire after a single use, a designated number of uses, in response to an event such as marking a delivery as "completed" or "fulfilled", or in response to user action such as manually causing the access code to expire. The parameters module 806 may also designate when an access code is valid. For example, an access code may only allow access to an enclosure 110 on certain days (e.g., weekdays, weekends, Mondays, etc.), or at certain times (e.g., business hours, afternoons, mornings, etc.) of the day.

An association module 808 may associate an access code with a tracking number, such as by linking the two in the database 112 previously discussed. A communication module 810 may be configured to communicate an access code to an access mechanism 600 of a customer's enclosure 110, along with any parameters associated with the access code. In certain embodiments, the communication module 810 may transmit the access code to the access mechanism 600 over the Internet or other suitable network. Other modules 812 providing other desired functionality may also be provided by the server 108, as needed.

At the control mechanism 606 (which may include the control module 606a and/or input device 606b), a verification module 814 may receive an access code entered at the input device 606b and compare the access code to one or more acceptable access codes. If a match occurs and any parameters associated with the matching access code are satisfied (e.g., the matching access code has not expired, the access code was entered within a specified access window, etc.), an actuation module 816 may actuate the access mechanism 600 of the customer's enclosure 110. A parameter enforcement module 818 may ensure that any parameters (e.g., expiration 824, permitted number of uses 826, access window 828, or other parameters 830) associated with an access code are enforced.

A notification module 820 may provide notifications (e.g., emails, text messages, audio messages, etc.) to a customer 102. For example, in some embodiments, the notification module 820 may notify the customer 102 anytime the access barrier 602 is opened and/or closed regardless of whether an access code was used to open or close the access barrier. The notification module 820 may also notify the user what access codes, if any, were used to access the enclosure 110. In other embodiments, the notification module 820 may notify a user whenever an access code (either correct or incorrect) is entered into the input device 606*b*. In yet other embodiments, the notification module 820 may notify a user when new access codes have been programmed into or removed from the system. In other embodiments, the notification module 820 may report a current status of the access barrier 602, such as whether the access barrier is open, closed, or moving. In yet other embodiments, the notification module 820 may notify a user if an enclosure 110 is opened without actuating the access mechanism 600 (such a scenario may occur where a garage door 602 is opened without use of a garage door opener 604, as may occur with a break in), as will be explained in more detail hereafter. Other notifications are possible and within the scope of the invention. Notifications may keep a user informed of the status of the enclosure 110 as well as the current state or changes to the current state of the system. Using this information, a user may determine if and when a package or other goods has been delivered into the enclosure 110, or if and when someone has accessed or attempted to access the enclosure 110, with or without authorization.

Referring to FIG. 8C, in certain embodiments, a customer device 612 (e.g., a mobile device 612 or other computing device 612) may host an access-code-management application 838 to administer access codes associated with the control mechanism 606. This access-code-management application 838 may include one or more of an add module 840, a parameters module 842, a modify module 844, a remove module 846, a status module 848, a view module 850, a notification module 852, a communication module 854, and other modules 856.

An add module 840 may enable a customer 102 to add access codes, as needed, to the control mechanism 606. These access codes may be permanent (until removed or altered by the customer 102) or temporary (automatically expiring at a specified time or in response to one or more events). A parameters module 842 may enable the customer 102 to establish parameters for the access codes, such as times or events that will cause the access codes to expire, access windows or restrictions when the access codes may be used, or the like. A modify module 844 may enable the customer 102 to modify an existing access code, such as by modifying the access code itself, or modifying parameters associated with the access code. A remove module 846, by contrast, may enable the customer 102 to remove access codes from the control mechanism 606 when they are no longer needed or desired.

A status module 848 may enable a user to see the status of various components of the access mechanism 600 and control mechanism 606. For example, the status module 848 may enable a user to see the current status of the access barrier 602 (e.g., garage door 602), such as whether the access barrier 602 is currently open, closed, or moving. In other or the same embodiments, the status module 848 may enable the customer 102 to see if a control mechanism 606*a* and/or input device 606*b* are up and running correctly, or if a communication link (Internet access, etc.) is active between the control module 606*a* and a server 108 or customer device 612. The status module 848 may also enable a customer to see current battery charge levels (of the input device 606*b* and/or control mechanism 606*a*) or current software or firmware versions that are being used. The status module 848 may keep the customer 102 informed of and/or enable the customer 102 to determine the current state of the system.

In certain embodiments, a view module 850 may enable a customer 102 to view information regarding the current system configuration or system use. For example, the view module 850 may enable a user to see all currently valid access codes, as well as parameter information associated with the access codes. Where the access codes are associated with tracking numbers, the view module 850 may also in certain embodiments enable the user to see the tracking numbers associated with the access codes. The view module 850 may also in certain embodiments enable a user to view historical information about the system. For example, the view module 850 may enable a user to view current and expired access codes utilized over a period of time, as well as historical use information associated with the access codes. For example, a user may view when particular access codes were used to access or to attempt to access an enclosure 110. These represent just a few exemplary types of information that may be displayed by the view module 850.

A notification module 852 may be used to provide notifications in response to certain system changes or events. For example, if a new access code is generated and programmed into the control module 606*a*, the notification module 852 may send a notification to an individual or entity intended to use the access code. For example, if a user generates a temporary access code to enable a repairman to access an enclosure 110, the notification module 852 may send a communication (e.g., an email or text message) to the repairman, notifying him or her that an access code has been generated to enable access to the enclosure 110. The notification may also contain the access code or provide information regarding how to retrieve or determine the access code. The communication may, in certain embodiments, also communicate any parameters associated with the access code, such as when the access code is valid or will expire, or when the access code may be used.

A communication module 854 may enable the customer device 612 to communicate with the control module 606*a* and/or server 108. For example, the communication module 854 may enable the customer device 612 to pull a current list of active access codes (and associated tracking numbers) from the control module 606*a* and/or server 108 for viewing. The communication module 854 may also enable the customer device 612 to communicate with and reconfigure the control module 606*a* with desired access codes. Other modules 856 providing additional features and functions may also be provided in the customer device 612.

Referring to FIGS. 9A through 9E, various exemplary pages 900 of an access-code-management application 838, configured to operate on a customer device 612, are illustrated. Such pages 900 may provide a graphical user interface (GUI) for many of the modules discussed in association with FIG. 8C.

Figure 9A:
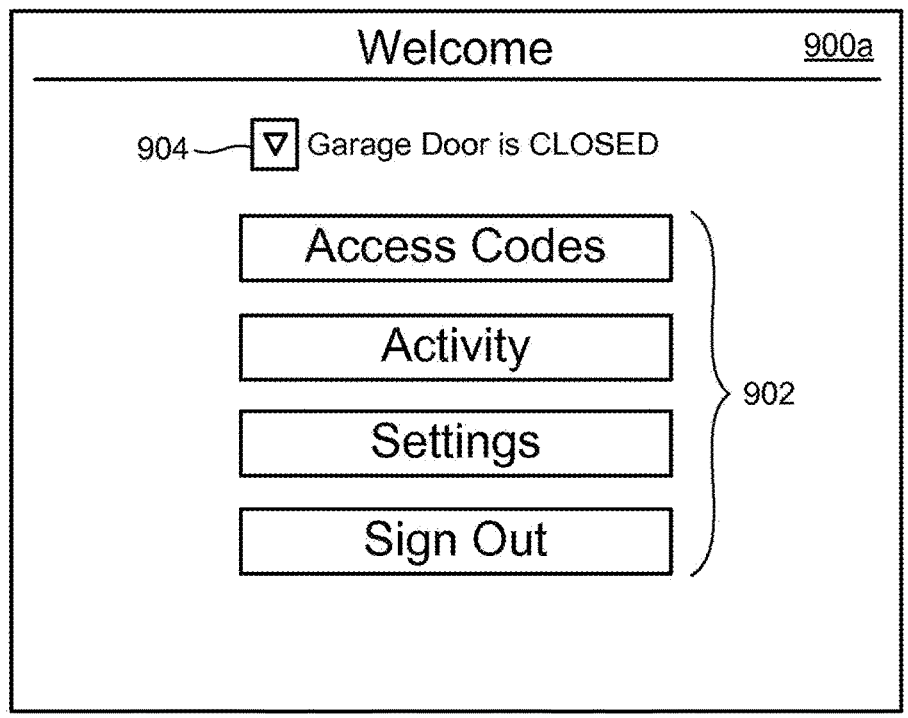

FIG. 9A shows one embodiment of a home page 900*a* or welcome screen 900*a*. As shown, the home page 900*a* may provide various types of information 904 and options 902 to a user. In the illustrated embodiment, the home page 900*a* shows a status 904 of a garage door 602, in particular indicating whether the garage door 602 is currently opened or closed. The home page 900a also provides a user various options 902, such as view or modify the user's access codes, view activity with respect to the access mechanism 600 and/or access codes, view settings of the access mechanism 600 and/or control mechanism 606, or the like.

Figure 9B:
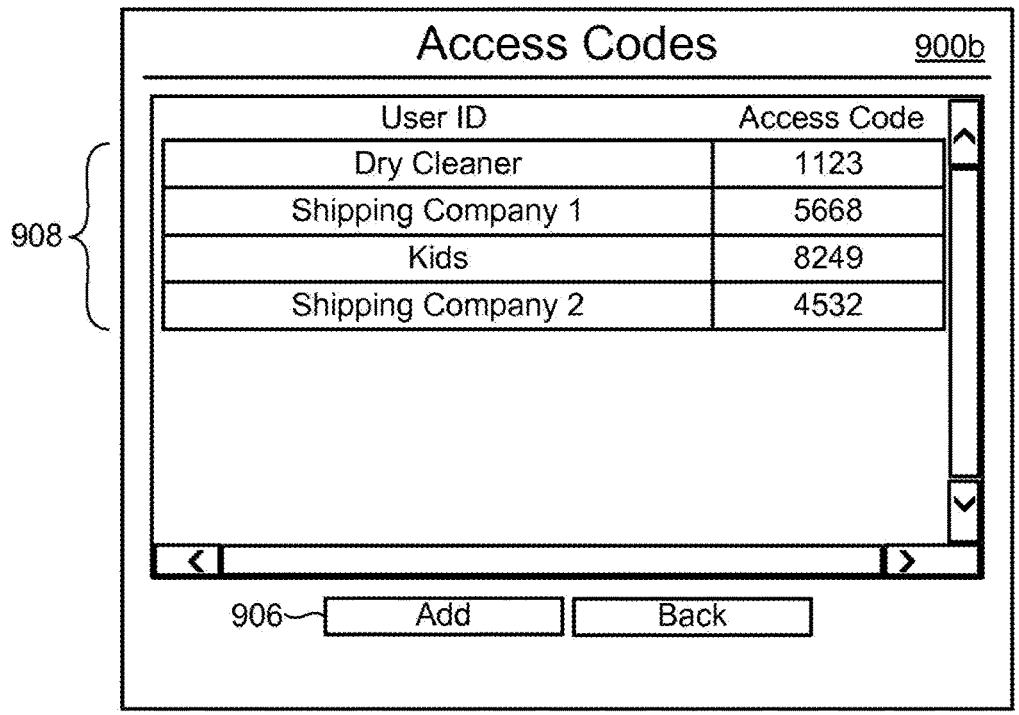

For example, referring to FIG. 9B, by selecting the "access codes" option 902, the user may be presented with a page 900b listing currently active access codes. In the illustrated embodiment, each access code is associated with a user identifier. This user identifier may be a word or phrase that enables the user to remember a purpose of the access code and/or who the access code is assigned to. In the illustrated example, the user identifier includes names such as "dry cleaner, shipping company 1," "kids," and "shipping company 2." Alternatively, or additionally, a term such as "shirts" or "Amazon" may be used to identify goods or a merchant associated with an access code. As further shown in FIG. 9B, an option 906 may be presented to the user to add a new access code. A page enabling the user to add an access code is illustrated in FIG. 9C. Options may also be provided to modify or remove an existing access code. For example, a user may select an existing access code in the list 908 and be presented with options to either modify or remove the access code.

In certain embodiments (not shown), the page 900b illustrated in FIG. 9B may optionally show access codes that have expired or been removed. This may allow a user to have a historical view of access codes that have been used over a period of time, including access codes that are no longer in use.

FIG. 9C shows one embodiment of a page 900c for adding an access code. As shown, the page 900c enables a user to designate a user identifier 910 and associated access code 912. In certain embodiments, the access code is randomly generated or is generated using an algorithm, such as a sequential and/or rotating algorithm. A sequential algorithm may generate access codes in a specified sequence whereas a rotating algorithm may enable eventual reuse of access codes (a repeating sequence, for example). In other embodiments, the user may designate the access code. As further shown in FIG. 9C, the page 900c may also enable various parameters 914 to be established for the access code 912. For example, the user may designate days of the week and/or times of the day when the access code is valid. In other embodiments, the user may establish when the access code expires, or what events (e.g., number of uses, etc.) may cause the access code to expire.

In certain embodiments, an option 916 may be provided to share the access code with an end user. For example, if an access code is generated on behalf of a repairman, an option 916 may be provided to share a copy of the access code with the repairman. In the illustrated embodiment, the page 900c enables a user to designate contact information, such as an email address or cellular phone number, so that a communication (e.g., email or test message) can be sent to the end user intended to utilize the access code. The communication may contain the access code 912 or instructions for retrieving the access code 912. Alternatively, or additionally, the communication may enable the access code 912 to be uploaded to an end user computing device, such as a mobile computing device. This may allow the end user to directly communicate the access code to the input device 606b using the computing device. In certain embodiments, the communication may also specify any parameters 914 associated with the access code 912, thereby informing the end user when or under what conditions the access code may be used.

FIG. 9D shows one embodiment of a page 900d for modifying an access code 912. As shown, the page 900d may enable a user to modify a user identifier 910 associated with an access code 912, the access code 912 itself, or parameters 914 associated with the access code. The page 900d may also allow the user to share the modified access code 912 and any modified parameters with an end user intended to use the access code 912.

FIG. 9E shows one embodiment of a page 900e displaying activity associated with an access mechanism 600 and/or access codes. In the illustrated embodiment, the user is presented with a table 918 that shows a user identifier, what actions were performed in association with the user identifier (e.g., whether an access barrier 602 was opened or closed), as well as a time and date the actions were performed. In certain embodiments, the activity is shown over a specified period of time, which may in certain embodiments be user configurable.

In certain embodiments, filters may be applied to data displayed on the page 900e. For example, an option 920 may be provided to "show all activity." Selecting this option 920 may display an expanded set 922 of data, as shown in FIG. 9F. This expanded set 922 of data may include, for example, operations or attempts to operate an access mechanism 600 that did not involve an access code, or unsuccessful attempts to open or close the access mechanism 600 using an incorrect access code. For example, as shown in FIG. 9F, a page 900f providing an expanded set 922 of data displays when a conventional remote control was used to operate the access mechanism 600 as well as an attempt to operate the access mechanism 600 using an invalid access code. In certain embodiments, the particular remote control that was used to operate the access mechanism 600 may be identified (e.g., "mom's remote," "kid's remote," etc.). Other activity that may be monitored may include opening or closing the access barrier 602 using an interior wall switch, or cases where an access barrier 602 was opened or closed without using the access mechanism 600 (such as in cases where the access barrier 602 is physically detached from the access mechanism 600 and operated manually).

Figure 9G:
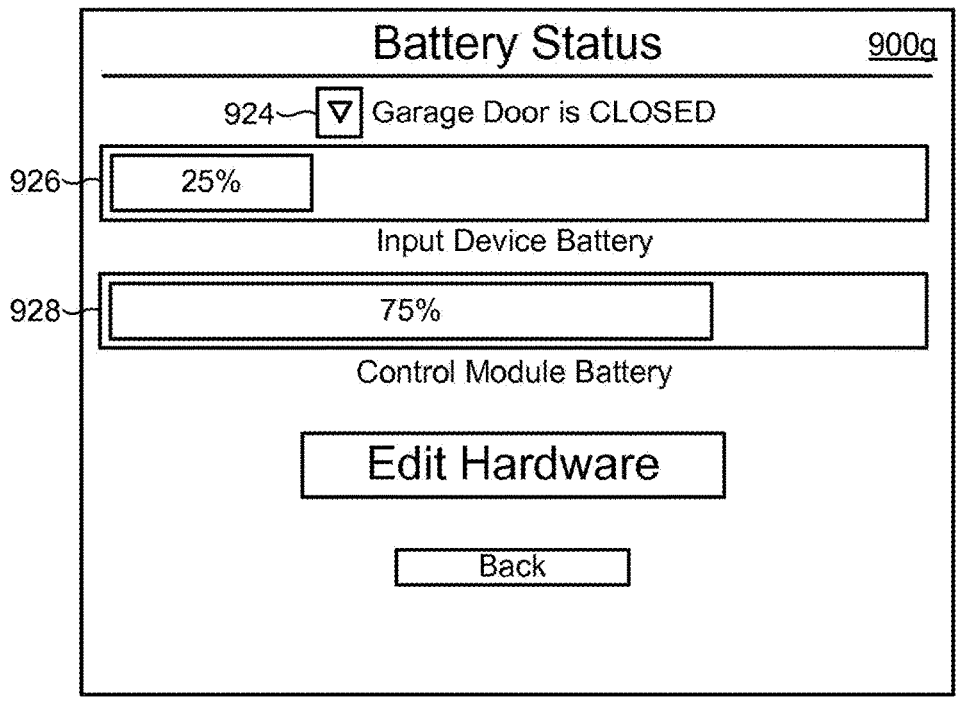

FIG. 9G shows one embodiment of a page 900g displaying various system status or settings. In the illustrated embodiment, the page 900g displays a current status 924 of an access barrier 602 (i.e., whether the access barrier 602 is opened or closed) as well as the status 926, 928 of various hardware devices, specifically the current battery charge level of an input device 606b and/or control module 606a. Other status information, such as whether an input device 606b, control module 606a, or various sensors 608 are up and running correctly, or an Internet or other network connection is operating correctly, may also be displayed.

Figure 9H:
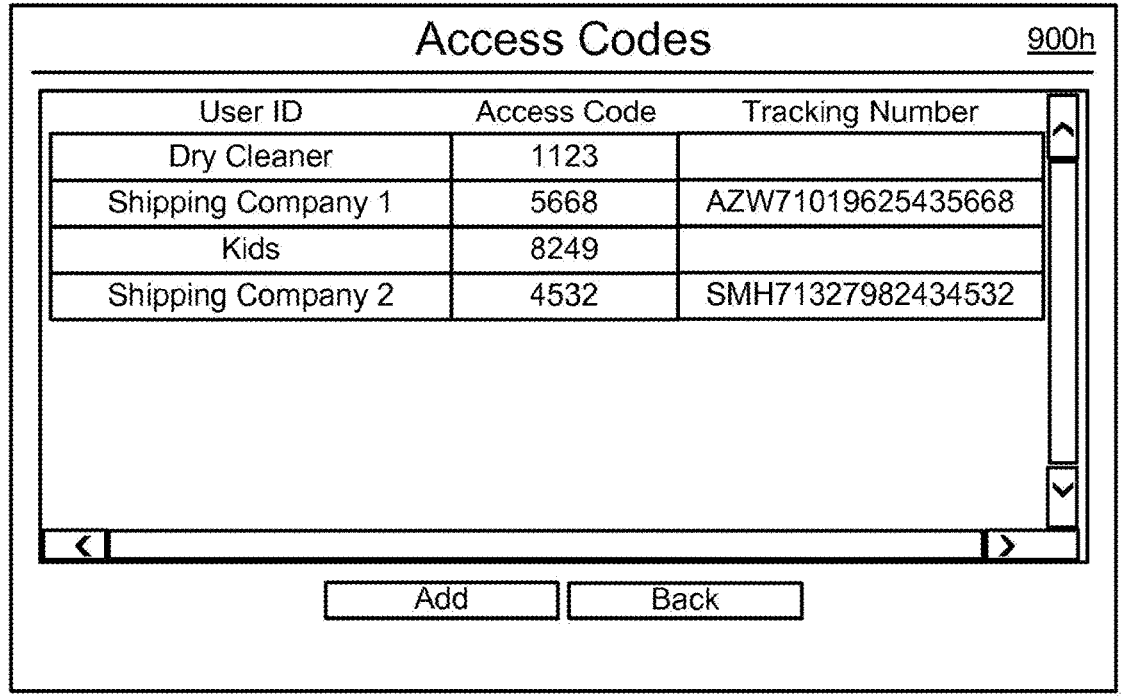

Variations of the pages 900a-g illustrated in FIGS. 9A through 9G are possible and within the scope of the invention. For example, referring to FIG. 9H, where an access-code-management application 838 is used in association with a delivery fulfillment system 100, as illustrated in FIGS. 1 through 5, a page 900h may be provided that links access codes to specific tracking numbers. Among other benefits, this feature may enable a user to track which access codes are associated with tracking numbers as well as determine if and when a particular package or goods has been delivered to an enclosure 110.

Figure 10:
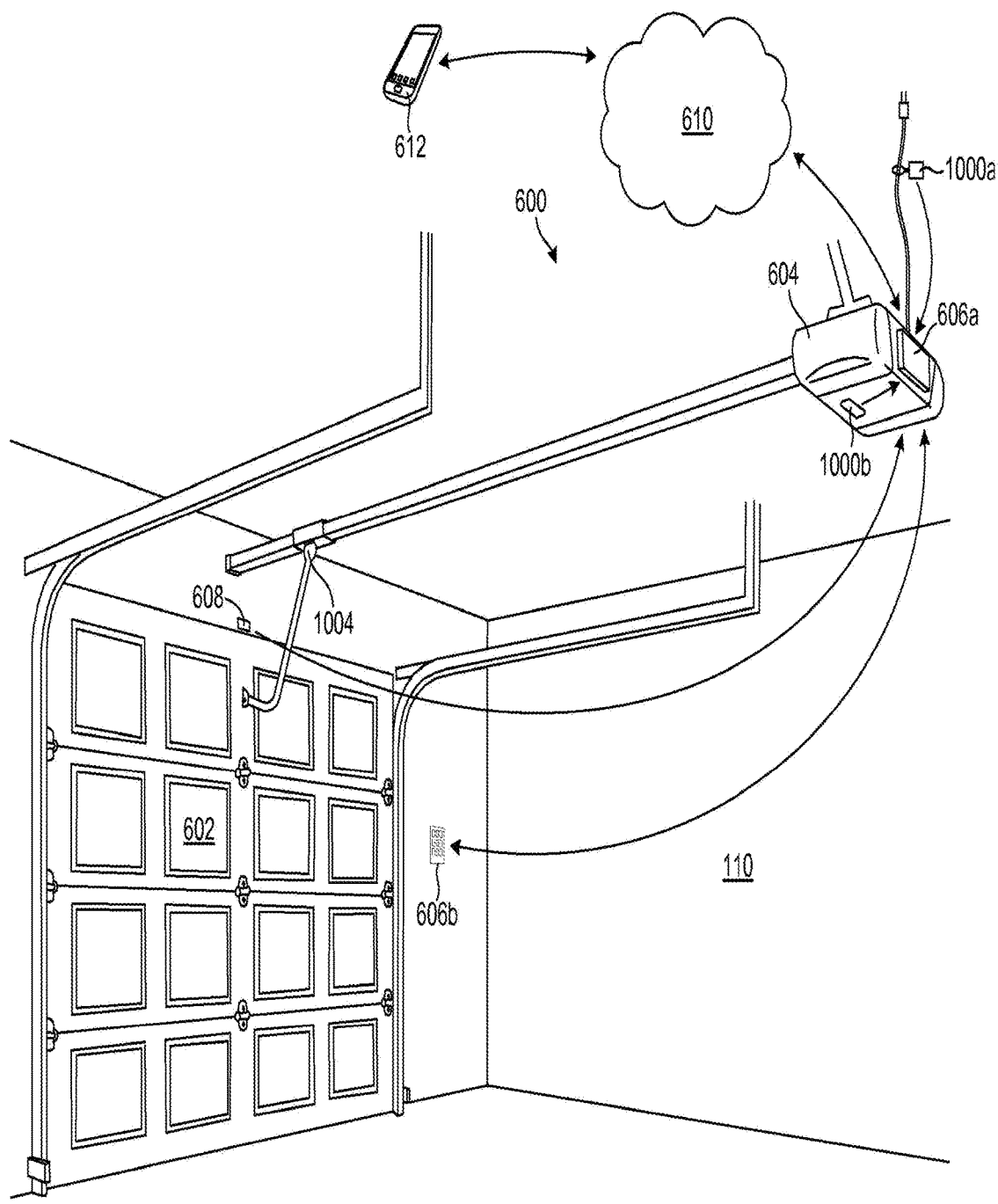
FIG. 10 shows one embodiment of a system for detecting potentially unauthorized access to an enclosure.

Referring to FIG. 10, as previously mentioned, in certain embodiments a user may be notified if an enclosure 110 is opened without actuating the access mechanism 600. Such a scenario may occur, for example, where a garage door 602 is opened without using a garage door opener 604. For example, a garage door opening mechanism 600 may include a latch 1004 or lever 1004 that allows a garage door 602 to temporarily disconnect from the garage door opening mechanism 600, thereby allowing the garage door 602 to be opened or closed manually without assistance from the garage door opening mechanism 600. This feature may enable a user to open or close a garage door 602 in the event of a power outage or failure of the garage door opening mechanism 600. Unfortunately, this feature may also enable unauthorized persons to break into garages 110 or other enclosures 110. For example, it has been well documented that a coat hanger or other wire may be inserted between a garage door 602 and the garage wall from the exterior of the garage 110 to manipulate the latch 1004 or lever 1004. This may disconnect the garage door 602 from the garage door opening mechanism 600 to enable unauthorized access to the garage 110.

In order to detect potentially unauthorized access to an enclosure 110 such as a garage 110, a control module 606a or other device in accordance with the invention may be configured to identify situations where the garage door 602 is opened without assistance from a garage door opening mechanism 600. In such situations, the garage door 602 may move while the motor and other connected parts of the garage door opening mechanism 600 may (1) remain substantially stationary or (2) move while not providing the motive force needed to move the garage door 602. Thus, detecting potential unauthorized access may be accomplished by detecting movement of the garage door 602 with a concurrent lack of movement or energization of the motor.

To accomplish this, one or more sensors 608 may be provided to detect movement of an access barrier 602 of the enclosure 110. For example, various magnetic sensors 608 currently on the market may be used to detect when the access barrier is opened or closed. Infra-red sensors 608, light sensors 608, or other suitable sensors 608 may also be used to detect movement of the access barrier 602.

Similarly, one or more sensors 1000 may be used to detect operation of a garage door opener 604, particularly a motor of the garage door opener 604. For example, a current sensor 1000a internal or external to the control module 606a may be used to detect whether the motor is energized by detecting electrical current drawn by the motor. If no current is drawn when a garage door 602 is opened, it may be concluded that the garage door opener 604 was not used to open the garage door 602. Alternatively, a vibration sensor 1000b may be used to detect vibration of the motor. Little or no vibration may indicate that a garage door opener 604 was not used to open a garage door 602. Other types of sensors may be used to detect operation of the motor in different embodiments. For example, a voltage sensor 1000 may detect a voltage drop of electrical power supplied to the motor, which occurs when the motor is energized. Alternatively, a movement sensor 1000 such as a rotational sensor may be used to detect rotation of the motor or movement of other parts (e.g., drive mechanism, chain, belt, etc.) connected to the motor.

In addition to detecting potentially unauthorized access, the sensors 608, 1000 may be used to detect other conditions which may warrant attention. For example, the sensors 608, 1000 may be used to detect scenarios where an access mechanism 600 was actuated but an access barrier 602 such as a garage door 602 did not open or close as intended, as may occur with a broken drive mechanism. This may allow the system to perform the operation again, perform diagnostics to determine the cause of the problem, and/or alert a user of the problem. Other sensors may also be incorporated into the control module 606a. For example, a camera (still or video) or motion sensor may be incorporated into or connected to the control module 606a to monitor activity that occurs whenever an access barrier 602 is opened and/or closed. For example, a camera feed could be recorded or monitored remotely anytime a garage door 602 is opened or closed to ensure that access codes are being used for authorized activities.

Figure 11:
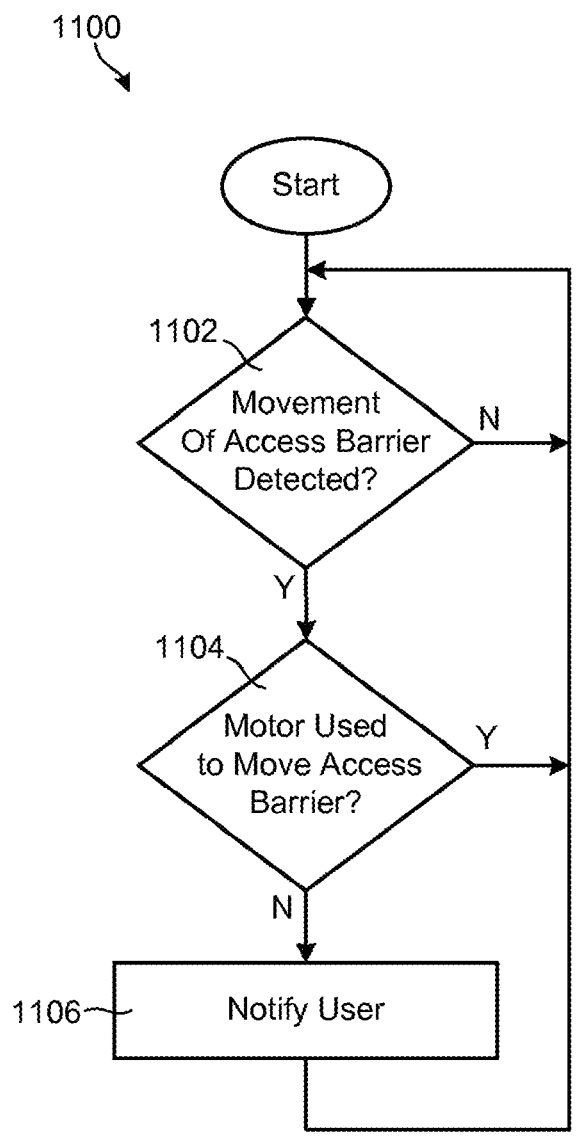
FIG. 11 shows one embodiment of a method for detecting potentially unauthorized access to an enclosure.

Referring to FIG. 11, one embodiment of a method 1100 for detecting potentially unauthorized access to an enclosure 110 is illustrated. Such a method 1100 may, in certain embodiments, be implemented in the control module 606a previously discussed. As shown, the method 1100 may initially determine 1102 whether an access barrier 602 (e.g., a garage door 602) has moved or is moving. This may be accomplished using the one or more sensors 608 previously discussed. If the access barrier 602 has moved or is moving, the method 1100 may determine 1104 whether a motor of an access mechanism 600 (e.g., a garage door opening mechanism 600) was used to move the access barrier 602. If the motor was not used to move the access barrier 602, the method 1100 may notify 1106 a user, such as by sending an email or text message to the user. Notifying 1106 the user may include notifying the user of potential unauthorized access to the enclosure 110.

Although particular reference has been made herein to enclosures 110 such as garages 110, the systems and methods disclosed herein may be equally applicable to other types of enclosures 110, such as reception boxes, living quarters, gated areas, warehouses, sheds, and the like. Such enclosures 110 may be substantially enclosed or enclosed around a perimeter thereof, as in a gated area. Thus, the term "enclosure', should be broadly interpreted to include all types of enclosures, whether fully enclosed or not. Similarly, the term "access mechanism," although described with particular reference herein to garage door opening mechanisms 600, may include a wide variety of different access mechanisms 600, including door locks, automatic door openers, gate locks, automatic gate openers, and the like. Nothing in this disclosure should be interpreted to indicate that the disclosed systems and methods are only applicable to garage door opening mechanisms 600.

Similarly, the phrase "tracking number" has been used primarily herein to describe unique identifiers issued by freight or shipping companies for packages or other deliveries of goods. However, in other embodiments a "tracking number" may include unique identifiers such as sales order numbers, product identifiers, or other unique identifiers that are used to identify or track orders of goods, shipments of goods, or particular products or items. Thus, the phrase "tracking number" is intended to be used broadly in the foregoing description and claims to encompass any type of unique identifier associated with a product or an order or shipment of goods.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
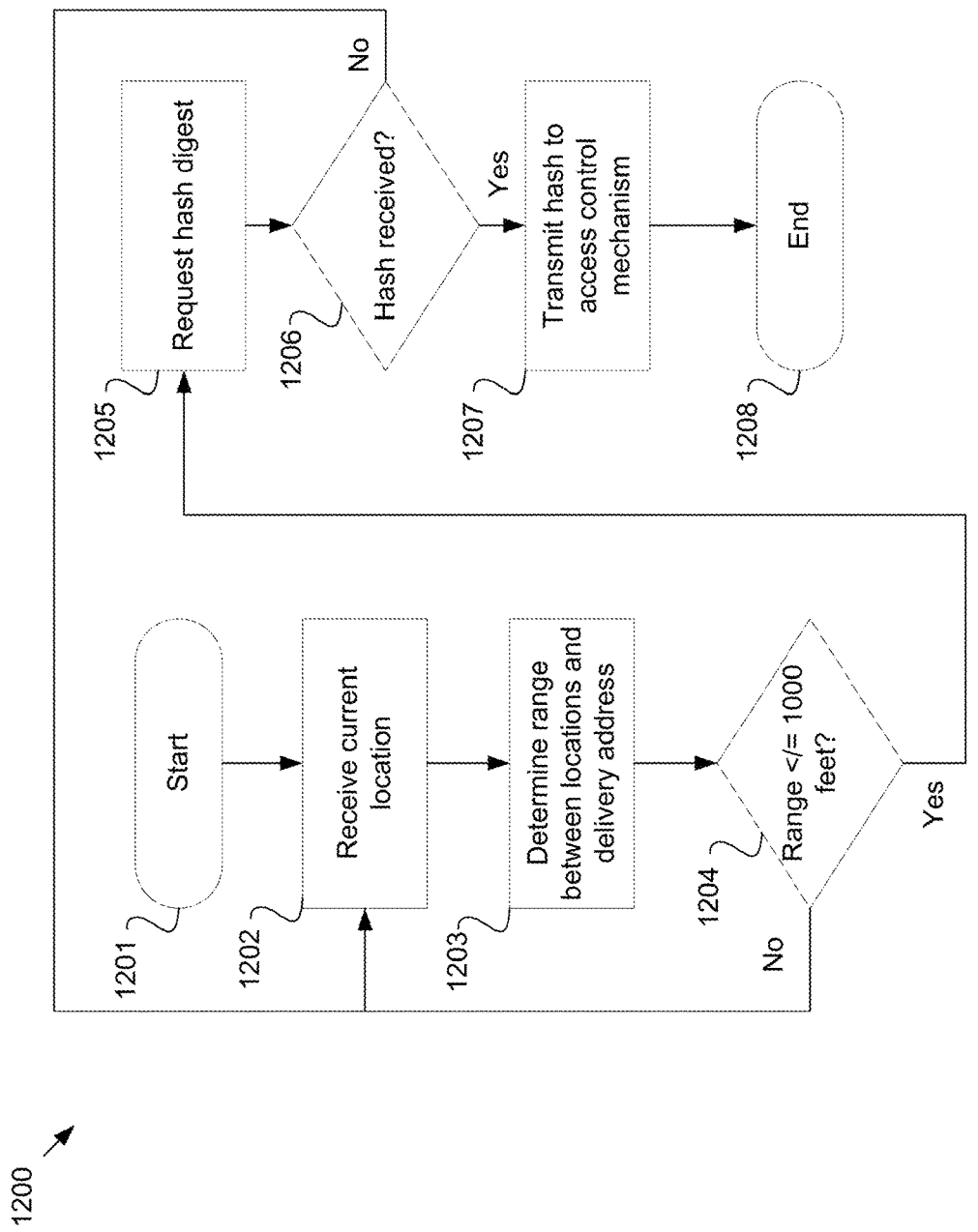
FIG. 12 depicts a method executable by a computer storing a computer program product having computer code for the depicted method steps.

FIG. 12 depicts a method executable by a computer storing a computer program product having computer code for the depicted method steps. The method, when performed by one or more computer processors, may enable access to an enclosure. The method includes, at block 1201, initiating the program. The program may, for example, be embodied as an application installed on a smartphone, tablet, personal computer, and/or other personal computing device. At block 1202, the method includes receiving a current geographic location of a device (e.g. the smartphone, tablet, personal computer, and/or personal computing device) on which the computer program product is stored. At block 1203, the method includes determining a range between the location of the device and a delivery address. At block 1204, a decision is made based on whether the range is less than or equal to 1000 feet. If so, the method 1200 proceeds to block 1205. If not, the method 1200 reverts to block 1202. At block 1205, a request is send from the device to a cloud-based server for a hash digest associated with a remote input receptor that controls access to the enclosure. The cloud-based server and the remote input receptor store a cryptographic hash function that generates the hash digest based on an acceptable input for the remote input receptor as described herein. At block 1206, a decision is made based on whether the hash is received. If so, the method 1200 proceeds to block 1207. If not, the method reverts to block 1202. Alternatively, the method 1200 may revert to block 1205. At block 1207, the hash digest is transmitted to the remote input receptor. The remote input receptor may apply the cryptographic hash function to the hash digest to unmask the acceptable input. The remote input receptor may actuate to permit access to the enclosure. At block 1208, the process is terminated.

The method 1200 provides many benefits immediately recognized by those of skill in the art. For example, the method 1200 allows for establishment of a unique acceptable input (e.g. a PIN number) for a remote input receptor without ever revealing the actual input and by only providing the hashed input to a user when the need for the input is immediate. Additional embodiments of the method 1200 may include transmitting with the request an authorization code that corresponds to a particular device, a particular user, or both. This further improves the security of providing for unattended access to an enclosure.

In some embodiments of the method 1200, a status of an access-governing parameter may be sent with the request for the hash digest. The hash digest may only be generated if the access-governing parameter correctly corresponds to a hash digest generation parameter stored on the cloud-based server. The parameters may comprise a current access number of a total number of permitted access events. For example, a particular acceptable input may be authorized for 5 uses (for example, a neighbor who has offered to feed the cat while the owner is out of town for 5 days). The hash digest generation parameter may be 5, and the access-governing parameter may be any of 1, 2, 3, 4 or 5. The cloud-based server may include an if-then statement asking whether the access-governing parameter is less than or equal to the hash digest generation parameter. If the statement is true, the hash digest is generated. Additionally, an update to the access-governing parameter may be returned to the device with the hash digest. In various other embodiments, the parameters may include one or more of a time, a day of the week, a date, a time range, a day of the week range, and a date range.

The cloud-based server may be a remotely-located server (i.e. at a different geographic address/location than the enclosure and/or device) that is either dedicated or shared. The server may be shared with other users of the enclosure access enablement system as described herein, and may dedicated solely for use by users of the enclosure access enablement system as described herein. Alternatively, the server may be dedicated to a particular user. The server may be connected to a network via WiFi, Ethernet, and/or other equivalents.

The device on which the computer program product is stored and by which it is run may be mobile, and thus may have a changing location relative to the delivery address. The location may be continuously or intermittently updated until the device is within the range. The location may select the delivery address based on an expected and pre-programmed order of delivery. Alternatively, a user of the device may manually initiate the location-checking and range calculation.

The maximum range required before the hash digest request is sent may be 1000 feet, from 100 feet to 900 feet, from 200 feet to 800 feet, from 300 feet to 700 feet, from 400 feet to 600 feet, from 450 feet to 550 feet, or less than or equal to 250 feet. A preferred range may be 500 feet, which will provide, on average, enough time between arrival at the access barrier and remote input receptor and sending of the request for the hash digest to be generated and transmitted to the user device. The range may be calculated from the location of the device to the delivery address based on a GPS coordinate or set of coordinates of each of the enclosure and the user device.

The delivery address may be associated with the enclosure and may direct the user to the proper location for the enclosure based on an addressing scheme for the locale of the enclosure. The delivery address may be associated with a set of GPS coordinates for comparison with the device location.

The cloud-based server and the remote input receptor may each store the acceptable inputs that, when provided by a user, may allow user access to the enclosure by permitting and causing the remote input receptor to actuate. The server and remote input receptor may also each store the same cryptographic hash function, such that the hash digest may be generated based on a particular acceptable input and deconstructed into the same acceptable input.

Figure 13:
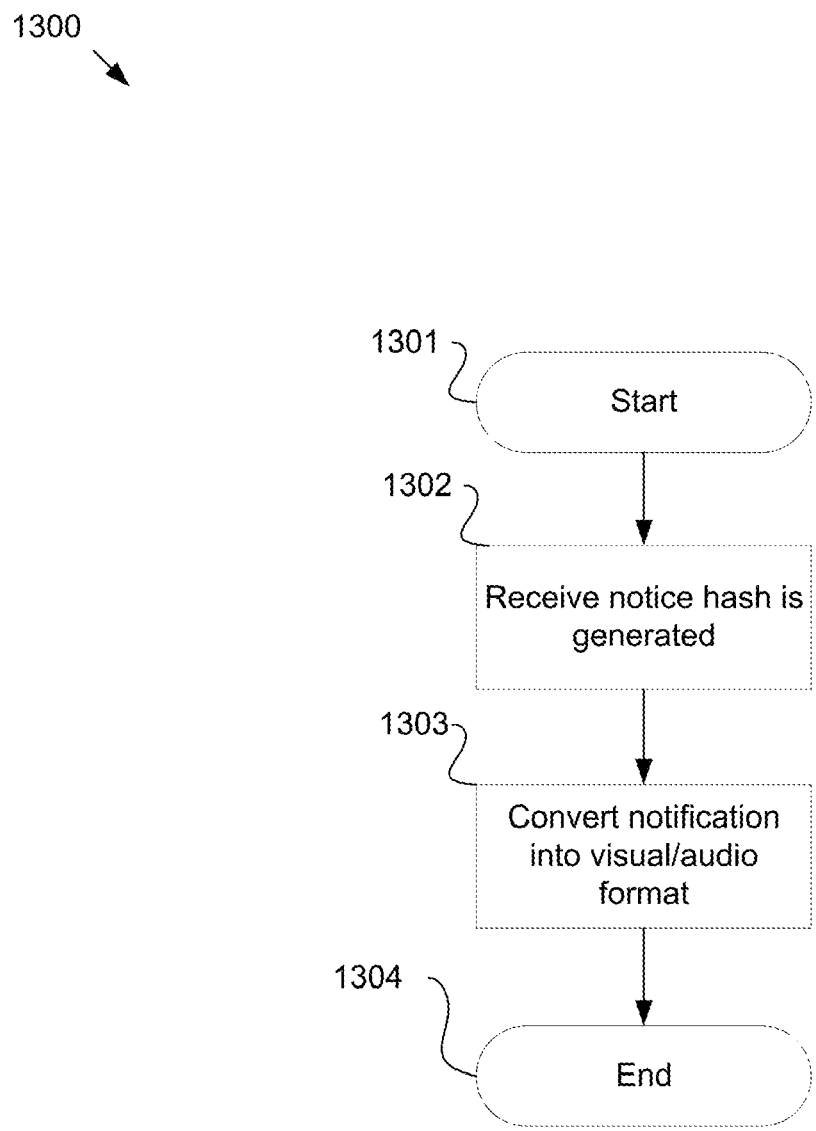
FIG. 13 depicts additional method steps executable by a computer storing a computer program product having computer code for the depicted method steps.

FIG. 13 depicts additional method steps executable by a computer storing a computer program product having computer code for the depicted method steps. The method 1300 includes, at block 1301, initiating the program. At block 1302, a communication designated for a user of the device is received. The communication informs the user the hash digest is generated. At block 1303, the communication is converted into one or more of a visual and audio format in which the user may consume the communication by, for example, reading text informing the user the hash digest is generated and/or hearing words informing the user the hash digest is generated. The communication may include one or more of a text message, and email and a phone call.

Figure 14:
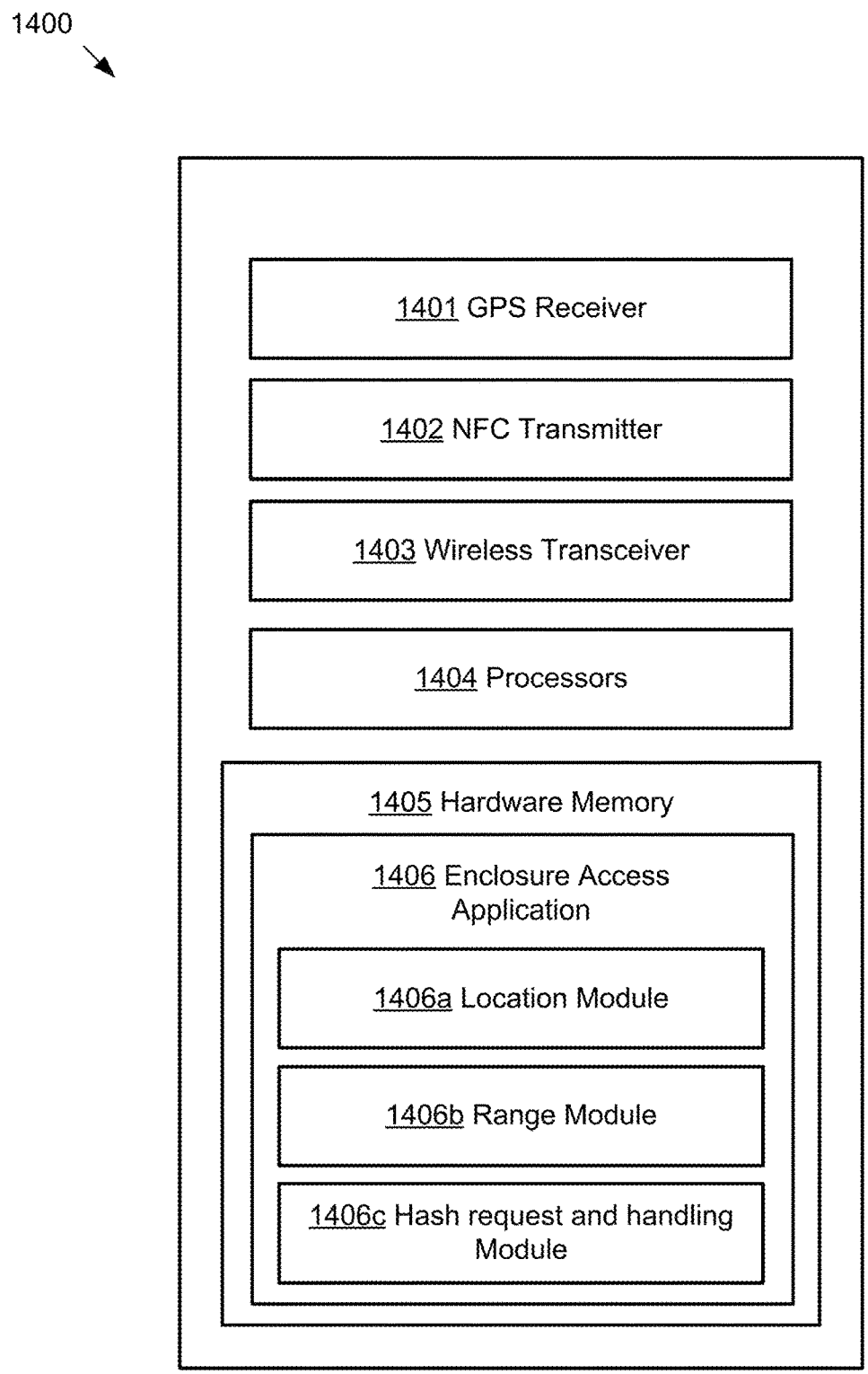
FIG. 14 depicts a system diagram of an apparatus that enables secure and efficient access to an enclosure, as described herein.

FIG. 14 depicts a system diagram of an apparatus that enables secure and efficient access to an enclosure, as described herein. The apparatus 1400 includes a global positioning system (GPS) receiver 1401, a near-field communications (NFC) transmitter 1402, a wireless transceiver

1403, one or more hardware processors 1404, and hardware memory 1405. The hardware memory stores an enclosure access application 1406. The enclosure access application 1406 includes: a location module 1406a, a range module 1406b, and a hash request and handling module 1406c. Each module may handle/perform one or more of the following tasks: receiving a current geographic location of the apparatus 1400 via the GPS receiver 1401; determining a range between the location and a delivery address; determining whether the range is less than or equal to a pre-determined distance, such as less than or equal to 1000 feet; as the range is less than or equal to the pre-determined distance, sending a request via the wireless transceiver to a cloud-based server for a hash digest associated with a remote input receptor that controls access to the enclosure, wherein the cloud-based server and the remote input receptor store a cryptographic hash function that generates the hash digest based on an acceptable input for the remote input receptor; receiving the hash digest via the wireless transceiver from the cloud-based server; and transmitting the hash digest via the NFC transmitter to the remote input receptor, wherein the remote input receptor applies the cryptographic hash function to the hash digest to unmask the acceptable input and actuates upon unmasking the acceptable input.

At least one of the modules 1406a-c may further handle/perform the task of receiving a communication designated for a user of the apparatus and converting the communication into one or more of a visual and audio format in which the user may consume the communication. The communication may inform the user the hash digest was generated. The communication may include one or more of a text message, an email, and a phone call.

At least one of the modules 1406a-c may further handle/perform the task pf sending with the request a status of an access-governing parameter (similar to that described above regarding FIG. 12). The hash digest is only generated if the access-governing parameter correctly corresponds to a hash digest generation parameter stored on the cloud-based server.

The apparatus 1400 may include one or more of a variety of personal computing devices such as a smartphone, a tablet, a personal computer, a virtual machine, and/or equivalents of such. The GPS receiver may receive location beacons from either a satellite or ground-based beacons. The GPS receiver 1401 may be integrated as a GPS transceiver that transmits a beacon to a satellite and/or one or more ground-based beacons. The NFC transmitter 1402 may be range-limited by the transmission strength of the NFC transmitter 1402, and/or by the sensitivity of a NFC receiver integrated with the remote input receptor. The NFC transmitter-receiver pair may have a maximum range of up to 6 inches, up to 1 foot, up to 3 feet, up to 5 feet, up to 10 feet, up to 20 feet, or up to 50 feet.

The wireless transceiver 1403 may communicate using one or more of a variety of communications protocols, including 3G, 4G, LTE, Wifi, Bluetooth, Zigbee, Z-wave, LoRa, SureFi (a FHSS protocol on the 900 MHz ISM band), and/or equivalents. The apparatus 1400 may therefore communicate via the wireless transceiver 1403 with the cloud-based server.

Figure 15:
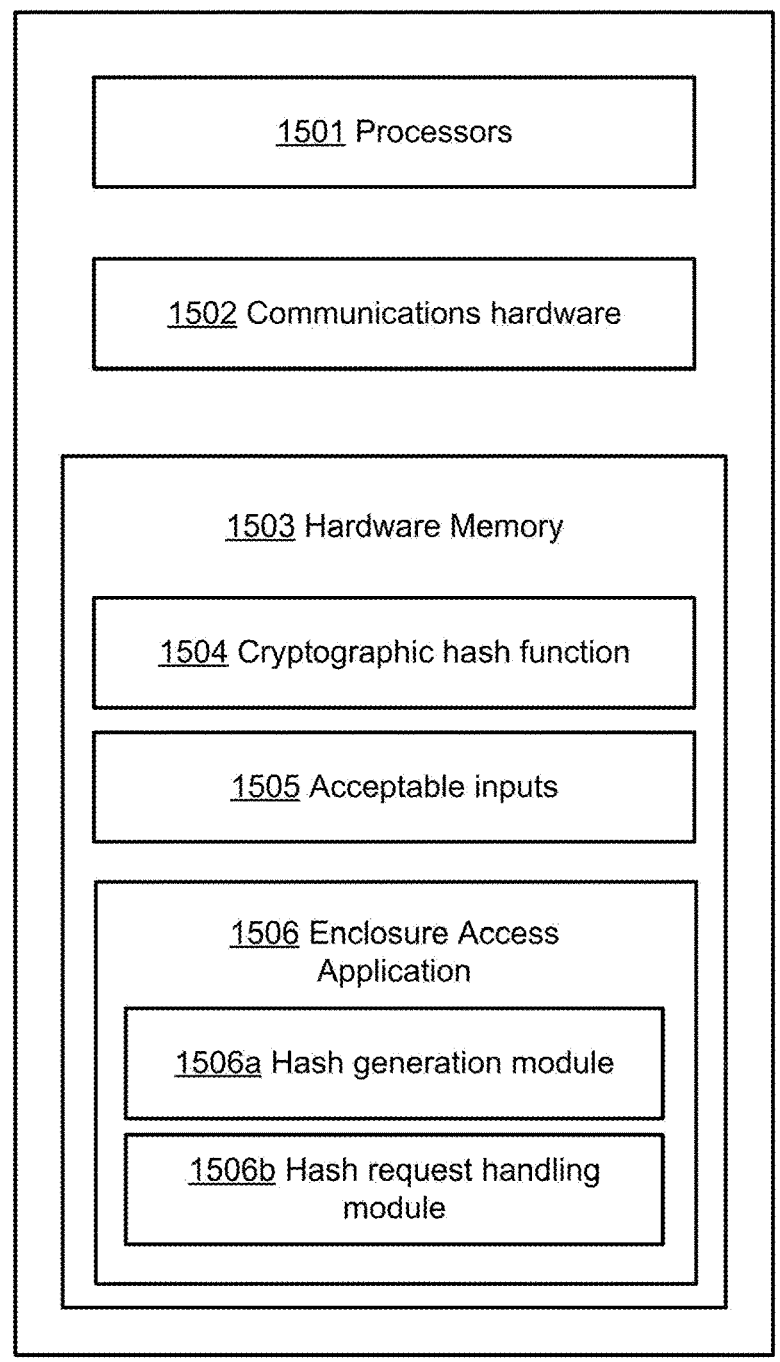
FIG. 15 depicts a system diagram of a cloud-based server that enables secure and efficient access to an enclosure, as described herein.

FIG. 15 depicts a system diagram of a cloud-based server that enables secure and efficient access to an enclosure, as described herein. The cloud-based server 1500 includes hardware processors 1501, communications hardware 1502, and hardware memory 1503. The hardware memory 1503 may store a cryptographic hash function 1504, one or more acceptable inputs 1505 associated with a remote input receptor that controls access to the enclosure, and an enclosure access application 1506. The application 1506 may include a hash generation module 1506a and a hash request handling module 1506b. In some embodiments (not depicted), the memory 1503 may also store a hash digest generation parameter.

Each of the modules 1506a-b may handle/perform one or more of the following tasks: receiving a request from a remote user device for the hash digest, wherein the remote user device indicates in the request proximity within a range less than or equal to 1000 feet between the remote user device and a delivery address of the enclosure; transmitting the hash digest to the remote user device, wherein the remote user device transmits the hash digest to the remote input receptor, and wherein the remote input receptor applies the cryptographic hash function to the hash digest to unmask the acceptable input and actuates upon unmasking the acceptable input; transmitting a communication designated for a user of the remote user device, wherein the communication informs the user the hash digest is generated; and receiving with the request a status of an access-governing parameter, wherein the hash digest is generated if the access-governing parameter correctly corresponds to the hash digest generation parameter. Additional modules besides those expressly disclosed may also be programmed in the application which may each handle/perform one or more of the preceding tasks. Such may also be true of the application described above regarding FIG. 14.

Figure 16:
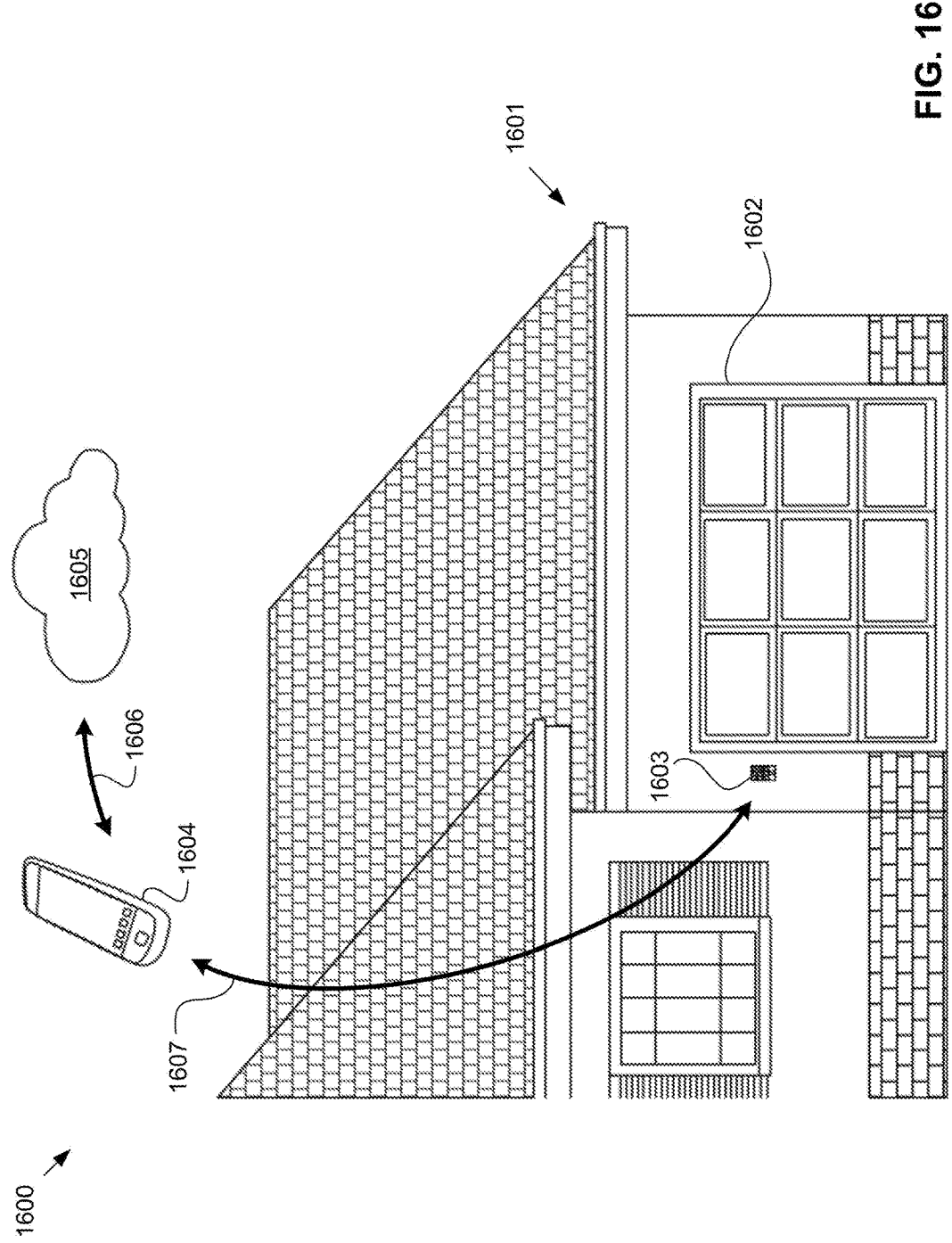
FIG. 16 shows one embodiment of a system implementing an apparatus that enables secure and efficient access to an enclosure as described herein.

FIG. 16 shows one embodiment of a system implementing an apparatus that enables secure and efficient access to an enclosure as described herein. The system 1600 includes the enclosure 1601 with an entry barrier 1602 and a remote input receptor 1603; a user device; and a cloud-based server 1605. In the depicted embodiment, the enclosure 1601 is a garage, the entry barrier 1602 is a garage door, the remote input receptor 1603 is a pin pad networked to a motor that actuates to open the garage door, and the user device 1604 is a smartphone with an application installed that performs the steps of: determining a GPS location of the device 1604; comparing the location of the device 1604 to a delivery address of the enclosure 1601 to determine a range between the location and the delivery address; when the range is less than or equal to 1000 feet, requesting a hash digest from the cloud-based server 1605 via a wireless network 1606; receiving the hash digest via the wireless network 1606; and transmitting the hash digest to the remote input receptor via NFC communication 1607. The remote input receptor 1603 is referred to as such because it is positioned remotely from the server and the mechanism that actuates the entry barrier 1602. However, it should be understood that the remote input receptor 1603 may be similar to input devices described above with regard to other embodiments.

Figure 17A:
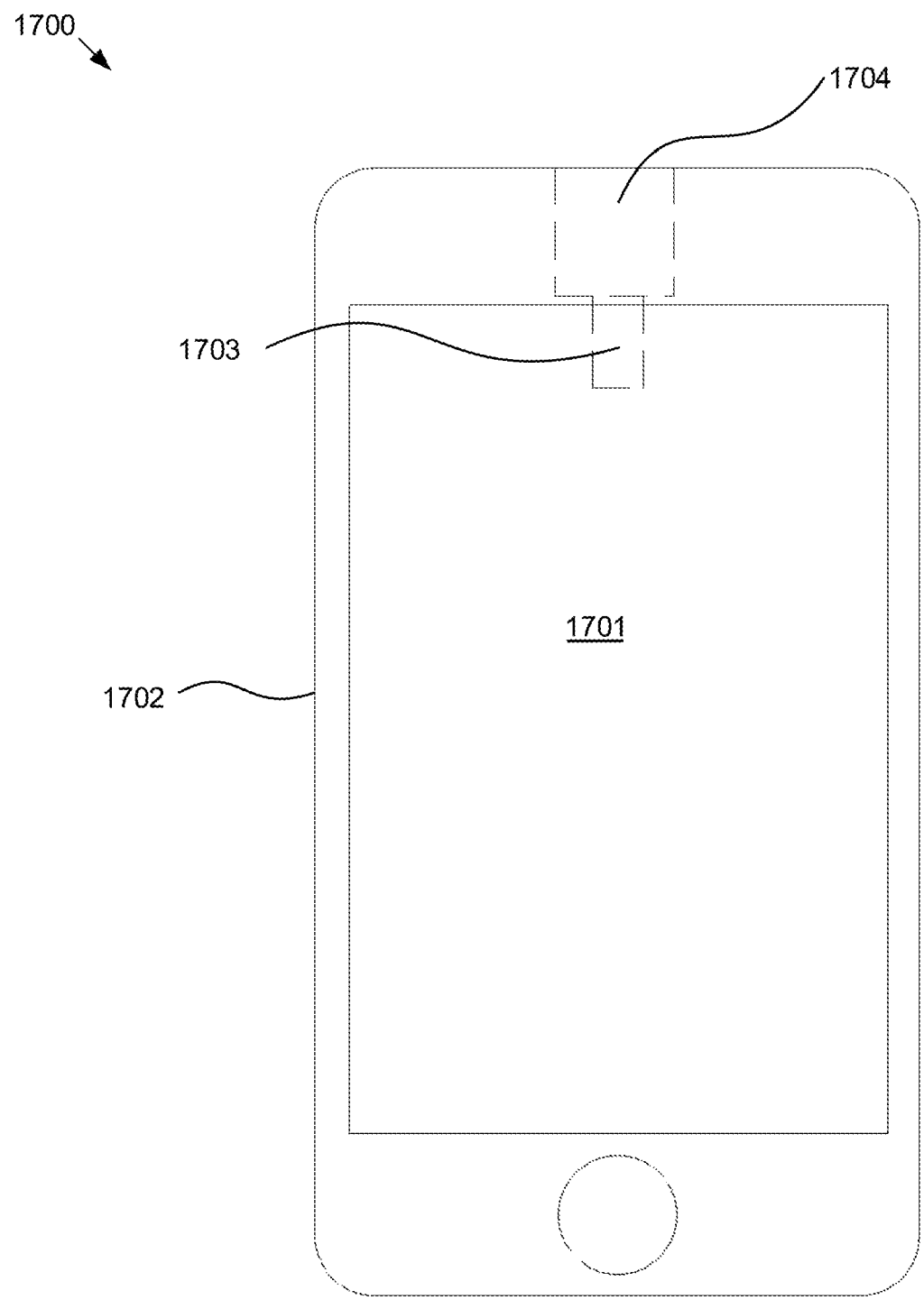
FIGS. 17A-B depict one embodiment of an apparatus for enabling secure and efficient access to an enclosure.
Figure 17B:
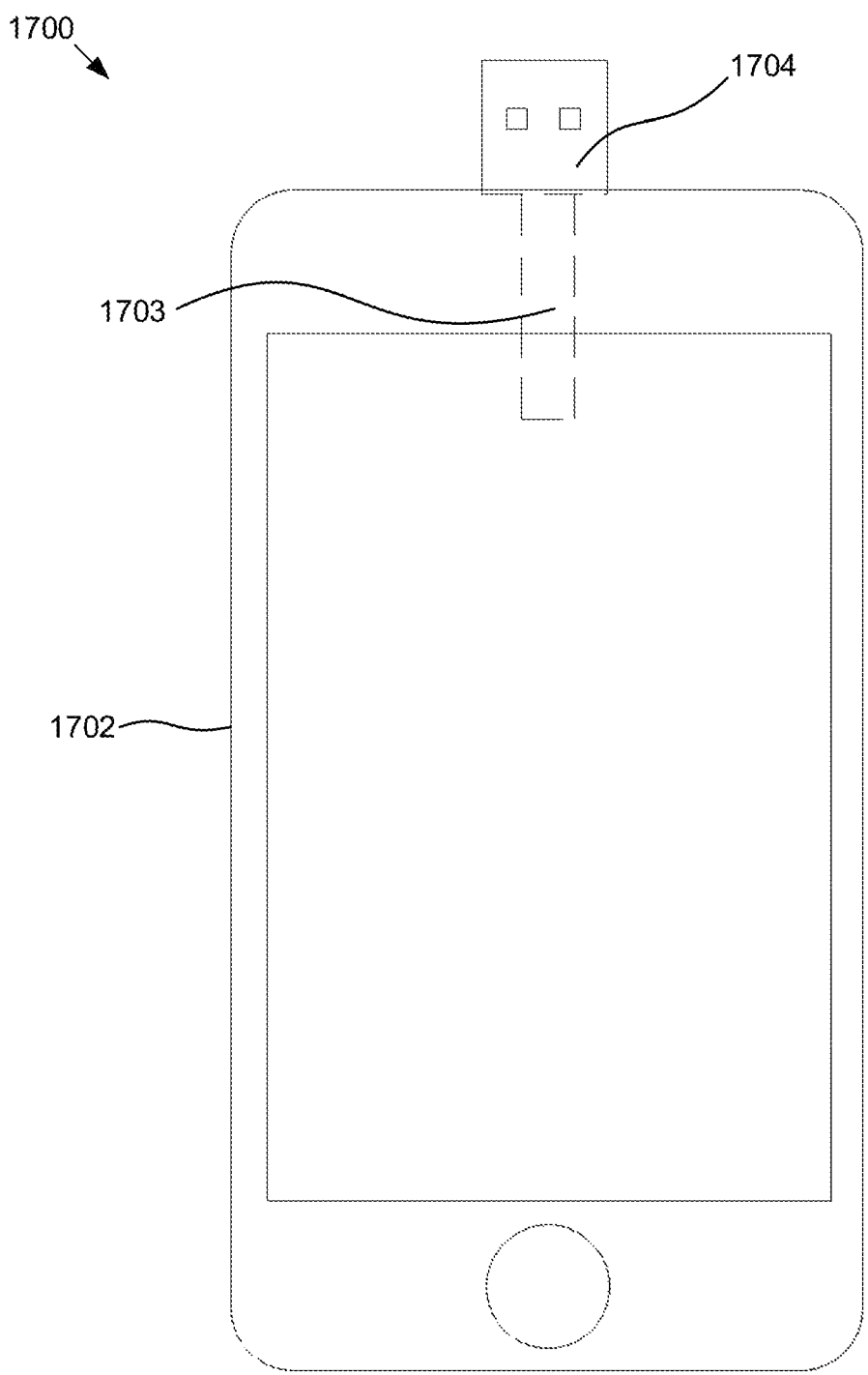

FIGS. 17A-B depict one embodiment of an apparatus for enabling secure and efficient access to an enclosure. The apparatus 1700 includes a user interface 1701, an outer protective shell or case 1702, a solenoid 1703, and an electrical interface 1704. In the depicted embodiment, the apparatus 1700 is a smartphone and the electrical interface 1704 is a male USB connector. However, the apparatus 1700 may be embodied as any of a variety of other devices, such as a tablet, a personal or enterprise digital assistant, or other equivalent portable computing device. Similarly, the electrical interface 1704 may be embodied as a male or female end of a variety of electrical data transmission connectors, including USB, mini USB, micro USB, FireWire, and/or other equivalents. The electrical interface 1704 may be modified from its standard construction to accommodate connection to the solenoid.

As shown in FIG. 17A, the solenoid 1703 and electrical interface 1704 are disposed within the apparatus 1700. As shown in FIG. 17B, the solenoid 1703 extends the electrical interface 1704 from the apparatus 1700. Hardware memory integrated with the apparatus 1700 may store instructions that, when executed by one or more hardware processors integrated with the apparatus 1700, extend the electrical interface 1704 from the apparatus 1700 by the solenoid 1703. The electrical interface 1703 may transmit a hash digest requested and received by the apparatus 1700 to a remote input receptor with a complementary electrical interface. In some embodiments, the apparatus 1700 may include an NFC receiver, and the remote input receptor may include an NFC transmitter. The memory may store instructions that, when executed by the processors, causes the solenoid 1703 to extend the electrical interface 1704 from the apparatus 1700 as the NFC receiver detects the remote input receptor is within a specified range, such as one foot, of the remote input receptor.

In general, the hardware memory of the apparatus 1700 may store a computer program product as described herein. The computer program product may include computer code for extending the electrical interface 1704 from the apparatus 1700 by the solenoid 1703 and computer code for transmitting the hash digest to the remote input receptor via the electrical interface 1704. The computer program product may further include computer code for detecting the apparatus 1700 is within a distance (such as one foot) of the remote input receptor and computer code for extending the electrical interface 1704 from the apparatus 1700 as the device is within the distance.

One benefit of the electrical interface 1704 and solenoid 1703 structure is security. The solenoid 1703 may only extend the electrical interface 1704 from the apparatus 1700 when a hash digest has been received AND the apparatus 1700 is within a specified distance of the remote input receptor. This may prevent unauthorized use of the device and/or unauthorized sharing of hash information by preventing access to the electrical interface 1704. A lid may be placed over the electrical interface 1704 enclosing the interface within the apparatus 1700. Wiring extending from the electrical interface 1704 may be bonded to one or more of the case 1702 or circuitry within the apparatus 1700 such that attempts to break into the apparatus 1700 cause breakage of the wiring, severing the electrical interface 1704 from the hardware memory of the apparatus 1700.

Figure 18:
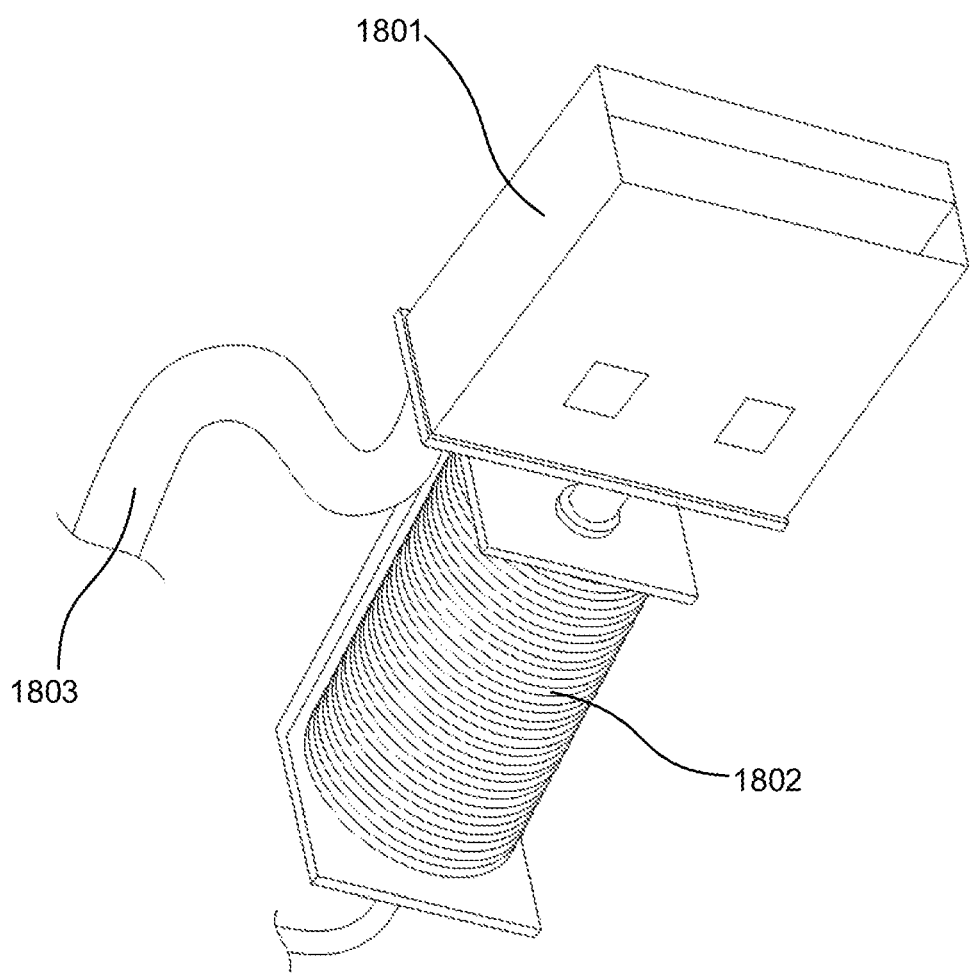
FIG. 18 depicts an isometric view of an electrical interface and solenoid for securely communicating data.

FIG. 18 depicts an isometric view of an electrical interface 1801 and solenoid 1802 for securely communicating data. Wiring 1803 connects the electrical interface 1801 to hardware processors and memory of the device in which the electrical interface 1801 and solenoid 1802 are disposed.

Figure 19A:
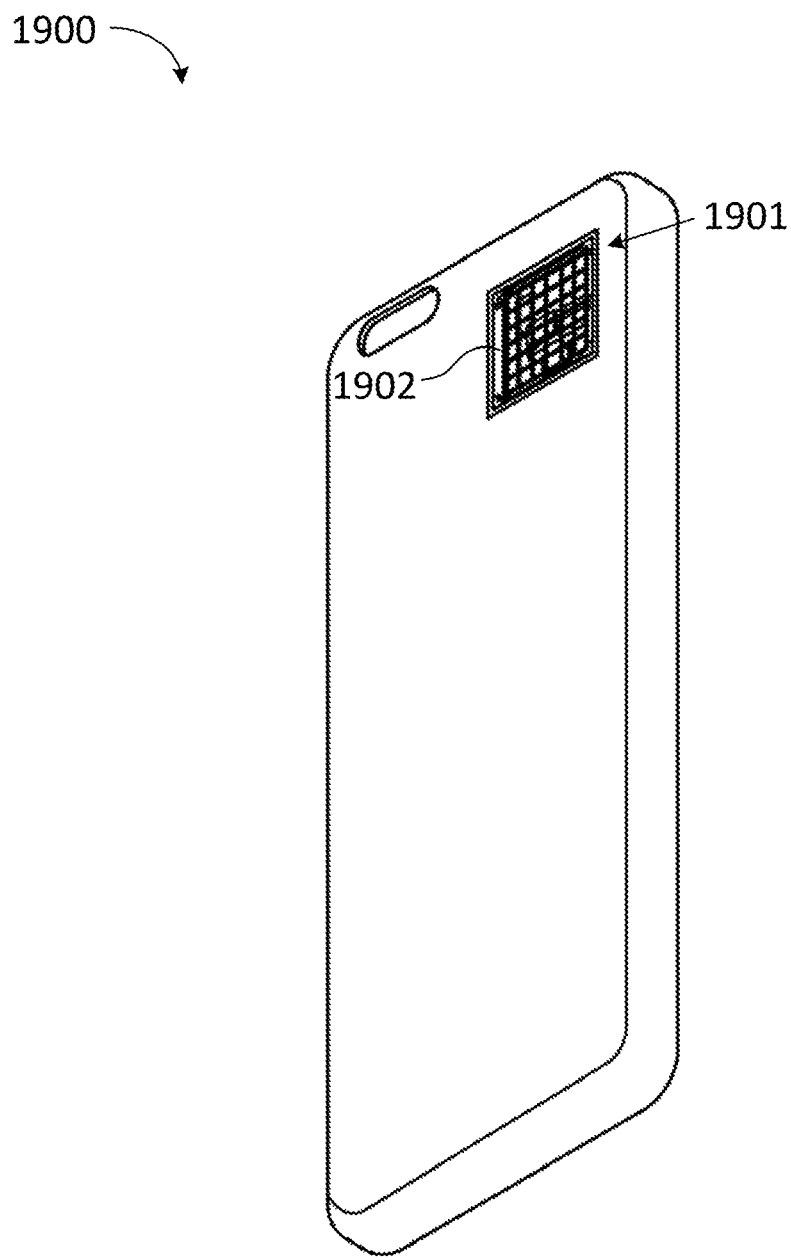
FIGS. 19A-C depict three views of an apparatus including a container having a selectably RF transparent side.
Figure 19B:
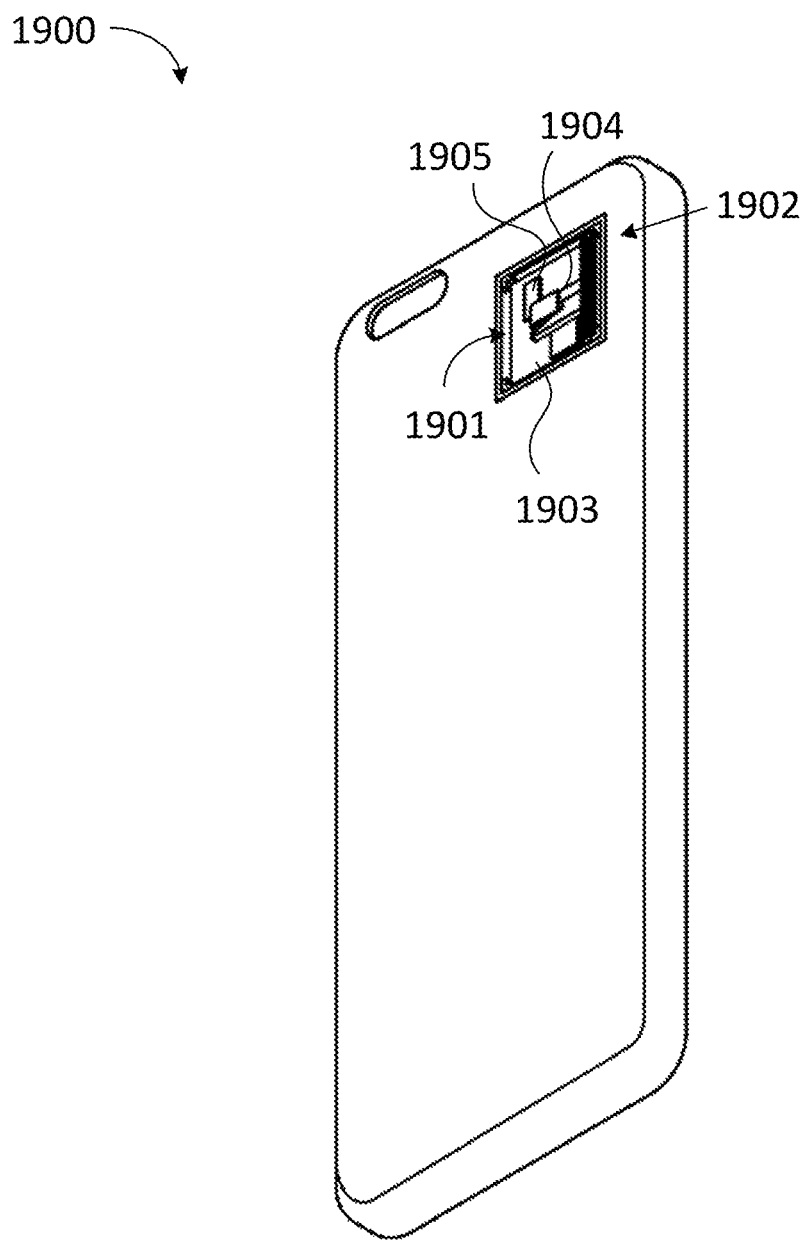
Figure 19C:
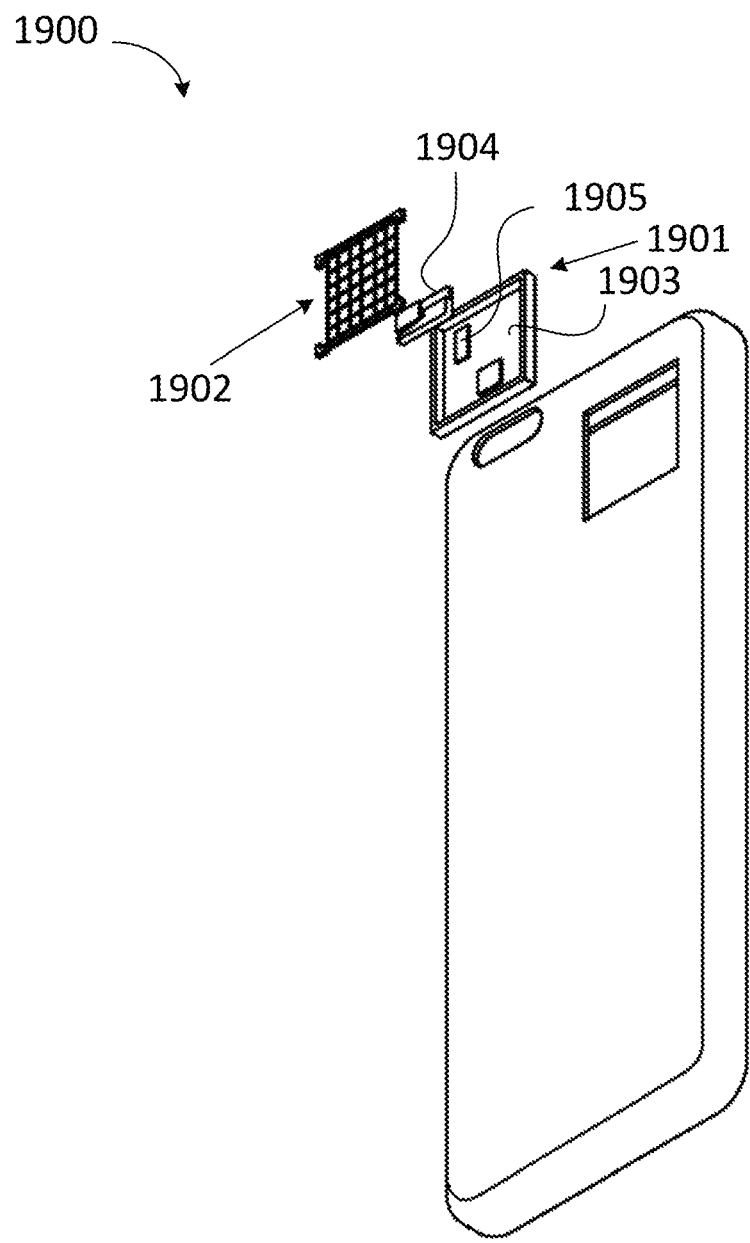

FIGS. 19A-C depict three views of an apparatus including an container having a selectably RF transparent side. FIG. 19A shows the apparatus in an RF opaque configuration. FIG. 19B shows the apparatus in an RF transparent configuration. FIG. 19C is an exploded view. The apparatus 1900 includes a container 1901 having a selectably RF transparent side 1902 and RF opaque sides 1903. An antenna 1904 and wireless transmitter 1905 are disposed within the container 1901. As described above with regard to other embodiments, an NFC receiver may be incorporated into the apparatus 1900 outside the container 1901. As the NFC receiver detects the apparatus is within proximity of the remote input receptor, the apparatus may convert the selectably RF transparent side 1902 from RF opaque to RF transparent. Such proximity may range from less than or equal to 8 inches, between 6 inches and 12 inches, and/or less than or equal to 24 inches. The wireless transmitter 1905 may then communicate information, via the antenna 1904, to the remote input receptor. The wireless transmitter 1905 may be tuned to be low range, such that the strength of the signal emitted by the antenna 1904 is less than or equal to negative 110 dBm at a distance greater than or equal to 12 inches from the transmitter 1905. The information communicated by the wireless transmitter 1905 may be the hash digest. The antenna 1904 may be a broadband microstrip antenna as disclosed in co-pending U.S. patent application Ser. No. 15/458,347, to Hall et al., entitled Broadband Microstrip Antenna, which is incorporated herein in its entirety for that it claims and teaches.

In various embodiments, the apparatus 1900 may also include an RF transparent pane disposed over the selectably RF transparent side 1902 of the container 1901. The pane may be visually transparent, visually opaque, may be tinted to reduce light transmission, or may at least partially obscure light transmission. The pane may be comprised of a plastic material or glass. This may provide protection to the components of the selectably RF transparent side 1902.

The selectably RF transparent side is described in more detail below. The RF opaque sides 1903 of the container 1901 may comprise one or more electrically conductive materials, such as metal or other equivalents. Additionally, one or more of the RF opaque sides 1903 of the container 1901 may include interconnects that connect the wireless transmitter to the hardware processors, hardware memory, or both, of the apparatus 1900. The hardware processors, hardware memory, or both, may be disposed outside the container 1901.

Figure 20:
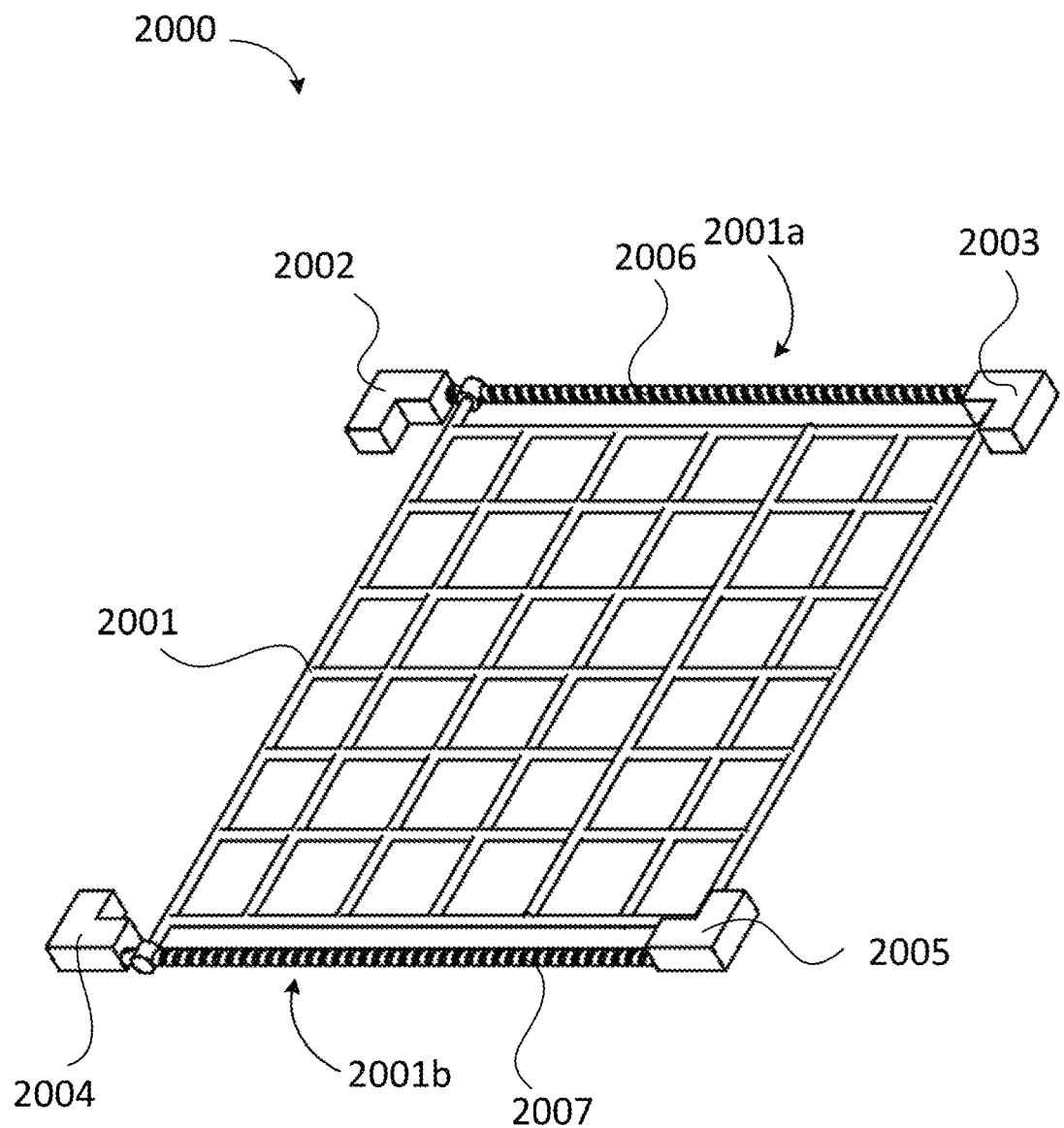
FIG. 20 depicts an embodiment of a selectably RF transparent side.

FIG. 20 depicts an embodiment of a selectably RF transparent side shown in, and described above regarding, FIGS. 19A-C. The selectably RF transparent side 2000 includes a mesh 2001, a first brace 2002, a second brace 2003, a third brace 2004, a fourth brace 2005, a first worm gear 2006, and a second worm gear 2007. Disposed in the first or second brace 2002, 2003 is a first motor that drives the first worm gear 2006. Disposed in the third or fourth brace 2004, 2005 is a second motor that drives the second worm gear 2007. The motors may be powered via electronics disposed within the container, our electronics outside the container. For example, the motors may be controlled by hardware processors disposed outside the container via interconnects through one or more of the RF opaque container sides.

As shown, the mesh 2001 is fixed at a first side 2001*a* to the first worm gear 2006, and at a second side 2001*b* to the second worm gear 2007. The first and second sides 2001*a,b* are also depicted as being fixed to braces 2003, 2005, which may contain the first and second motors. However, the first and second sides 2001*a,b* may be fixed to at least one of the RF opaque sides of the container.

We claim:

1. An apparatus that enables access to an enclosure, the apparatus comprising:
a container having at least one side selectably transparent to radio frequency (RF) transmissions, the other sides of the container opaque to RF transmissions;
a wireless transmitter disposed within the container, and a wireless transceiver, a global positioning system (GPS) receiver, and a near-field communications (NFC) receiver each disposed outside the container;

one or more hardware processors and hardware memory storing instructions that, when executed by the one or more hardware processors:

receives a current geographic location of the apparatus via the GPS receiver;

determines a range between the location and a delivery address;

as the range is less than or equal to 1000 feet, sends a request to a cloud-based server via the second wireless transceiver for a hash digest associated with a remote input receptor that controls access to the enclosure, wherein the cloud-based server and the remote input receptor store a cryptographic hash function that generates the hash digest based on an acceptable input for the remote input receptor;

receives the hash digest via the wireless transceiver from the cloud-based server;

as the NFC receiver detects the apparatus is within a distance less than or equal to 8 inches, converts the selectably transparent side of the container to RF transparent; and transmits the hash digest via the wireless transmitter to the remote input receptor, wherein the remote input receptor applies the cryptographic hash function to the hash digest to unmask the acceptable input and allow access to the enclosure.

2. The apparatus of claim 1, wherein the hardware memory further stores instructions that, when executed by the one or more hardware processors:

receives a communication designated for a user of the apparatus, wherein the communication informs the user the hash digest is generated; and converts the communication into one or more of a visual and audio format in which the user may consume the communication.

3. The apparatus of claim 2, wherein the communication comprises one or more of a text message, an email, and a phone call.

4. The apparatus of claim 1, the hardware memory further storing instructions that, when executed by the one or more hardware processors:

sends with the request a status of an access-governing parameter, wherein the hash digest is generated if the access-governing parameter correctly corresponds to a hash digest generation parameter stored on the cloud-based server.

5. The apparatus of claim 4, wherein the parameters comprise a current access number of a total number of permitted access events.

6. The apparatus of claim 5, wherein the parameters comprise one or more of a time, a day of the week, and a date within a range of dates.

7. The apparatus of claim 1, wherein the selectably transparent side of the container comprises a mesh formed of electrically conductive material.

8. The apparatus of claim 7, wherein the mesh is fixed at a first side to a first worm gear driven by a first motor, and wherein the mesh is fixed at a second side to a second worm gear driven by a second motor.

9. The apparatus of claim 8, wherein the first and second sides are opposite sides of the mesh.

10. The apparatus of claim 8, wherein a third side of the mesh adjacent to the first side, the second side, or both, is fixed to at least one of the RF opaque sides of the container.

11. The apparatus of claim 8, wherein a third side of the mesh adjacent to the first side, the second side, or both, is fixed to the first motor, the second motor, or both.

12. The apparatus of claim 7, wherein the selectably transparent side of the container further comprises an RF transparent pane disposed over the mesh.

13. The apparatus of claim 12, wherein the pane is visually transparent.

14. The apparatus of claim 12, wherein the pane is visually opaque.

15. The apparatus of claim 12, wherein the pane comprises a plastic material.

16. The apparatus of claim 12, wherein the pane comprises a glass material.

17. The apparatus of claim 1, wherein the RF opaque sides of the container comprise one or more electrically conductive materials.

18. The apparatus of claim 17, wherein the RF opaque sides of the container comprise metal.

19. The apparatus of claim 17, wherein one or more of the RF opaque sides of the container comprise interconnects that connect the wireless transmitter to the hardware processors, hardware memory, or both, the hardware processors, hardware memory, or both, disposed outside the container.

20. The apparatus that enables access to an enclosure of claim 1, wherein the wireless transmitter and wireless transceiver are in communication with a broadband microstrip antenna disposed within the apparatus.

* * * * *